United States Patent
Yamashita et al.

(10) Patent No.: US 9,342,451 B2
(45) Date of Patent: May 17, 2016

(54) PROCESSOR MANAGEMENT METHOD

(71) Applicant: FUJITSU LIMITED, Kawasaki-shi, Kanagawa (JP)

(72) Inventors: Koichiro Yamashita, Hachioji (JP); Hiromasa Yamauchi, Kawasaki (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 304 days.

(21) Appl. No.: 13/972,059

(22) Filed: Aug. 21, 2013

(65) Prior Publication Data
US 2013/0339632 A1 Dec. 19, 2013

Related U.S. Application Data

(63) Continuation of application No. PCT/JP2011/053732, filed on Feb. 21, 2011.

(51) Int. Cl.
- *G06F 12/12* (2006.01)
- *G06F 12/02* (2006.01)
- *G06F 11/07* (2006.01)
- *G06F 11/14* (2006.01)
- *G06F 11/20* (2006.01)

(52) U.S. Cl.
CPC ........ *G06F 12/0284* (2013.01); *G06F 11/0742* (2013.01); *G06F 11/0751* (2013.01); *G06F 11/1484* (2013.01); *G06F 11/2025* (2013.01); *G06F 11/2035* (2013.01); *G06F 11/2097* (2013.01)

(58) Field of Classification Search
CPC .. G06F 3/067; G06F 12/0284; G06F 11/0742
USPC .......................................................... 711/148
See application file for complete search history.

(56) References Cited

U.S. PATENT DOCUMENTS

| | | | |
|---|---|---|---|
| 5,265,238 | A | 11/1993 | Canova, Jr. et al. |
| 5,931,938 | A | 8/1999 | Drogichen et al. |
| 6,553,465 | B1 | 4/2003 | Takusagawa |

(Continued)

FOREIGN PATENT DOCUMENTS

| | | |
|---|---|---|
| CN | 1963761 A | 5/2007 |
| JP | 3-217137 | 9/1991 |

(Continued)

OTHER PUBLICATIONS

International Search Report mailed May 24, 2011 in corresponding International Application No. PCT/JP2011/053732.

(Continued)

*Primary Examiner* — Jae Yu
(74) *Attorney, Agent, or Firm* — Staas & Halsey LLP

(57) ABSTRACT

A processor management method includes setting a master mechanism in a given processor among multiple processors, where the master mechanism manages the processors; setting a local master mechanism and a virtual master mechanism in each of processors other than the given processor among the processors, where the local master mechanism and the virtual master mechanism manage each of the processors; and notifying by the master mechanism, the processors of an offset value of an address to allow a shared memory managed by the master mechanism to be accessed as a continuous memory by the processors.

11 Claims, 21 Drawing Sheets

(56) References Cited

U.S. PATENT DOCUMENTS

| | | | |
|---|---|---|---|
| 2004/0215640 A1* | 10/2004 | Bamford | G06F 17/30575 |
| 2005/0124381 A1 | 6/2005 | Kim et al. | |
| 2007/0288585 A1 | 12/2007 | Sekiguchi et al. | |
| 2010/0125715 A1* | 5/2010 | Takamatsu | G06F 3/0605 711/170 |

FOREIGN PATENT DOCUMENTS

| | | |
|---|---|---|
| JP | 4-156655 | 5/1992 |
| JP | 4-317156 A | 11/1992 |
| JP | 5-181742 | 7/1993 |
| JP | 6-274432 | 9/1994 |
| JP | 7-84921 | 3/1995 |
| JP | 8-314875 | 11/1996 |
| JP | 10-228458 | 8/1998 |
| JP | 2000-222375 | 8/2000 |
| JP | 2001-188690 | 7/2001 |
| JP | 2005-176371 | 6/2005 |
| JP | 2007-304687 | 11/2007 |
| JP | 2009-211279 | 9/2009 |

OTHER PUBLICATIONS

International Preliminary Report on Patentability issued Aug. 29, 2013 in corresponding International Patent Application No. PCT/JP2011/053732.

Japanese Office Action dated Mar. 10, 2015 in corresponding Japanese Patent Application No. 2013-500740.

Chinese Office Action issued Nov. 24, 2015 in corresponding Chinese Patent Application No. 201180067933.7.

Office Action issued by the Japanese Patent Office on Jan. 5, 2016 in corresponding Japanese patent application No. 2013-500740.

* cited by examiner

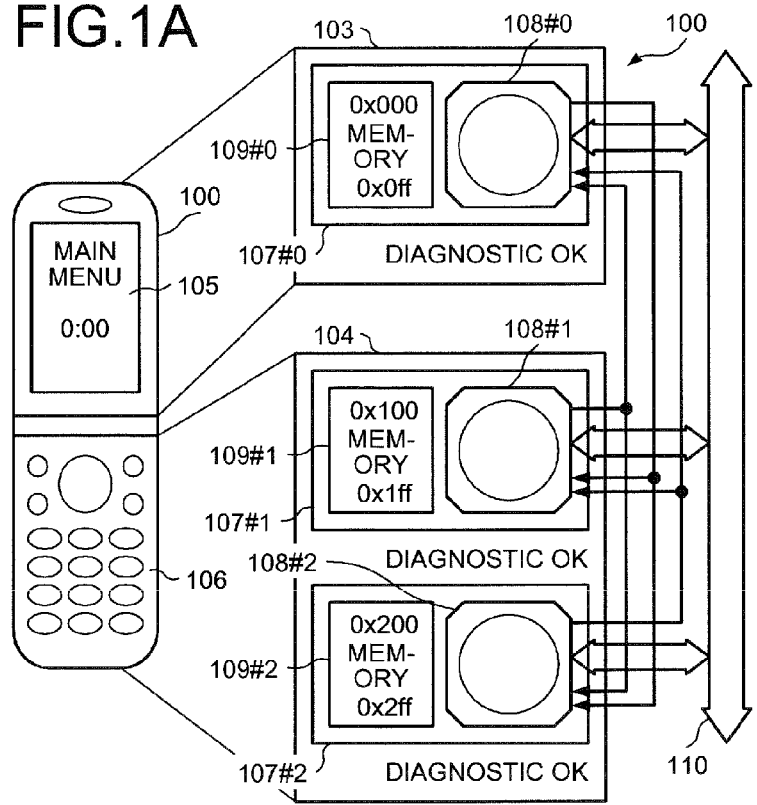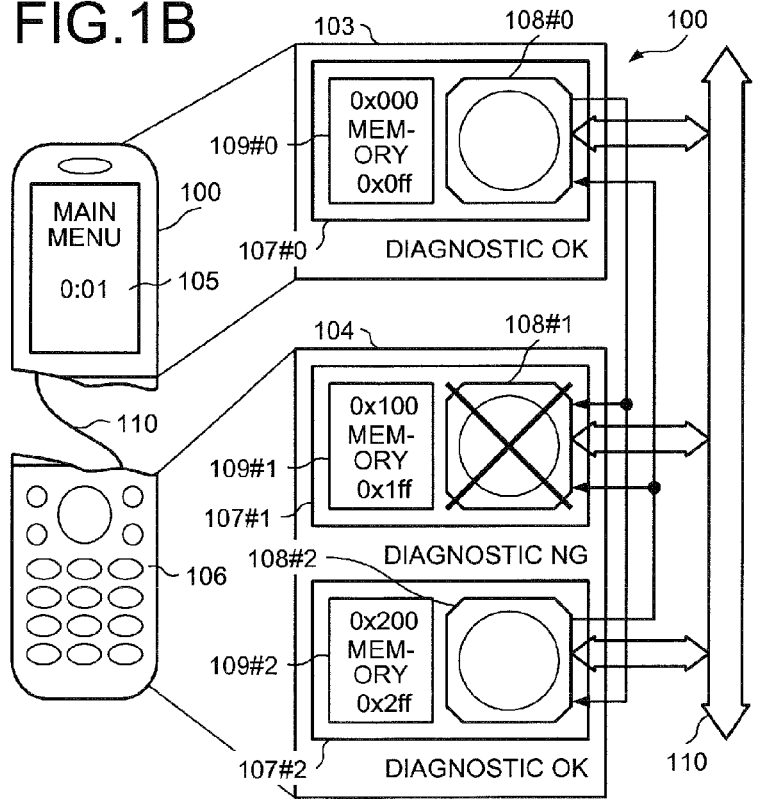

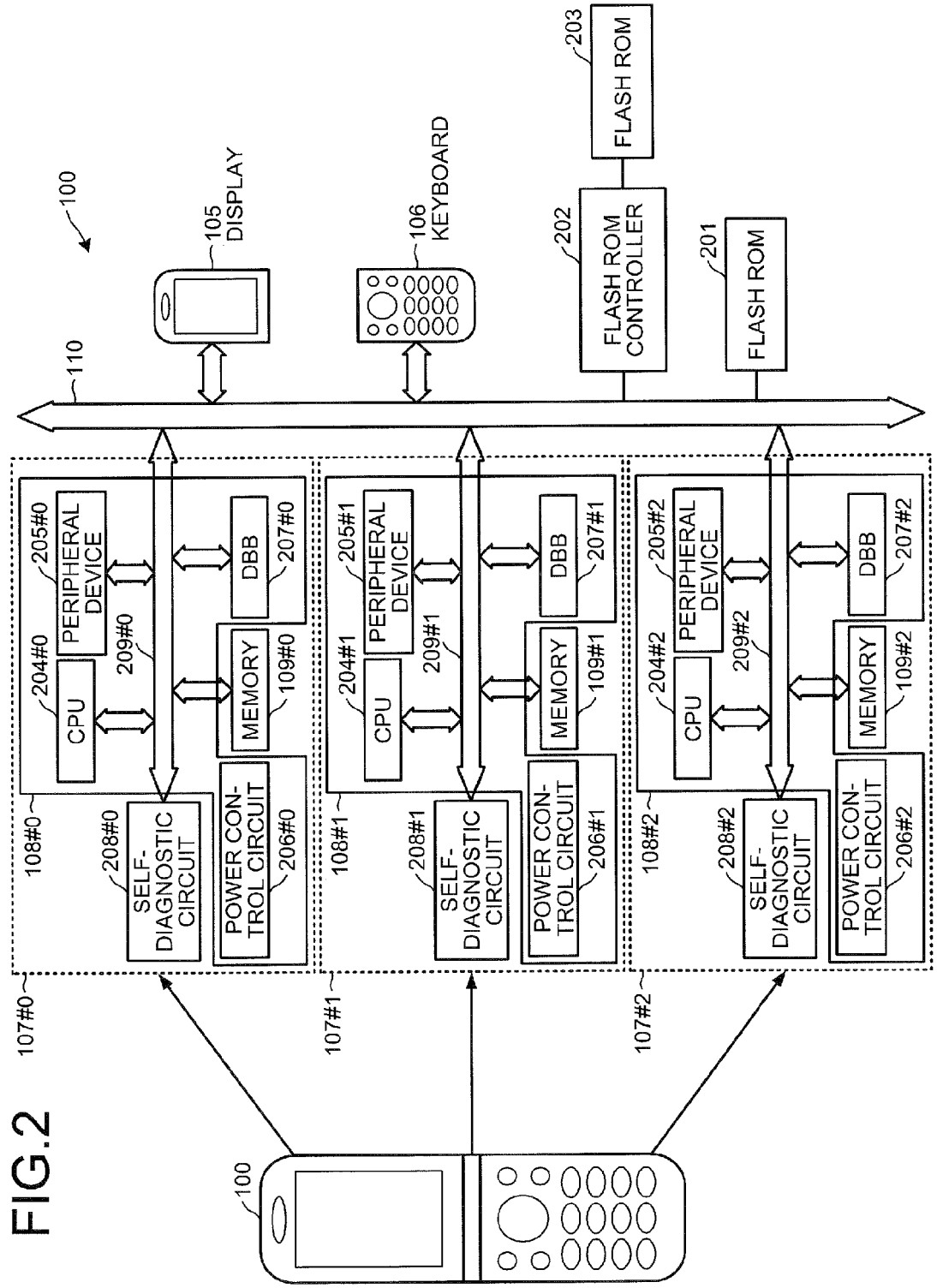

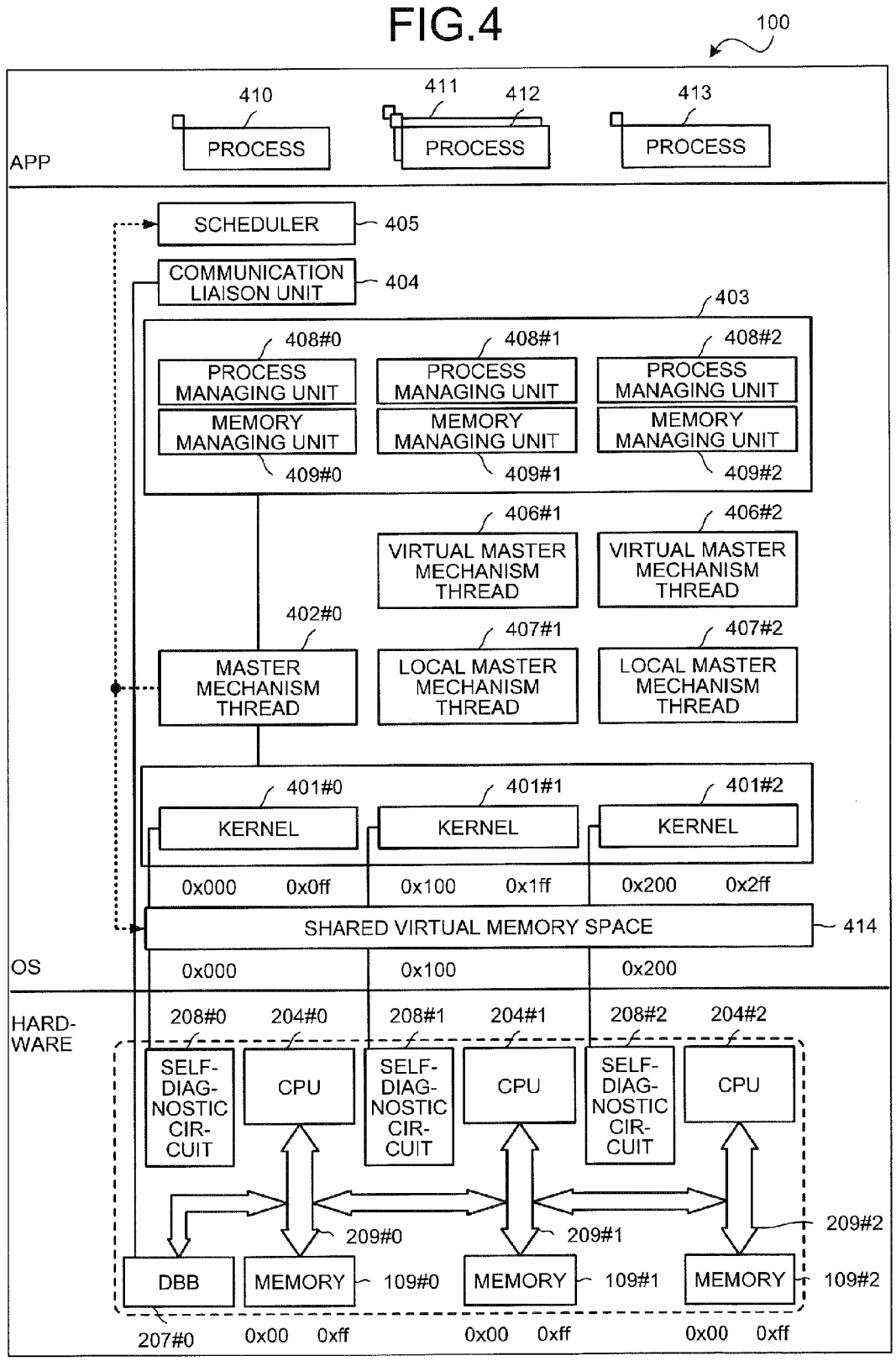

FIG.9

| DOMAIN TYPE | DIAGNOSTIC TIME | DIAGNOSTIC RESULT | |
|---|---|---|---|
| MASTER DOMAIN | 12:34:00 | OK | |
| SLAVE DOMAIN RANKED 1 | 12:34:00 | OK | |
| SLAVE DOMAIN RANKED 2 | 12:33:00 | OK | FAILURE DETECTED |

303

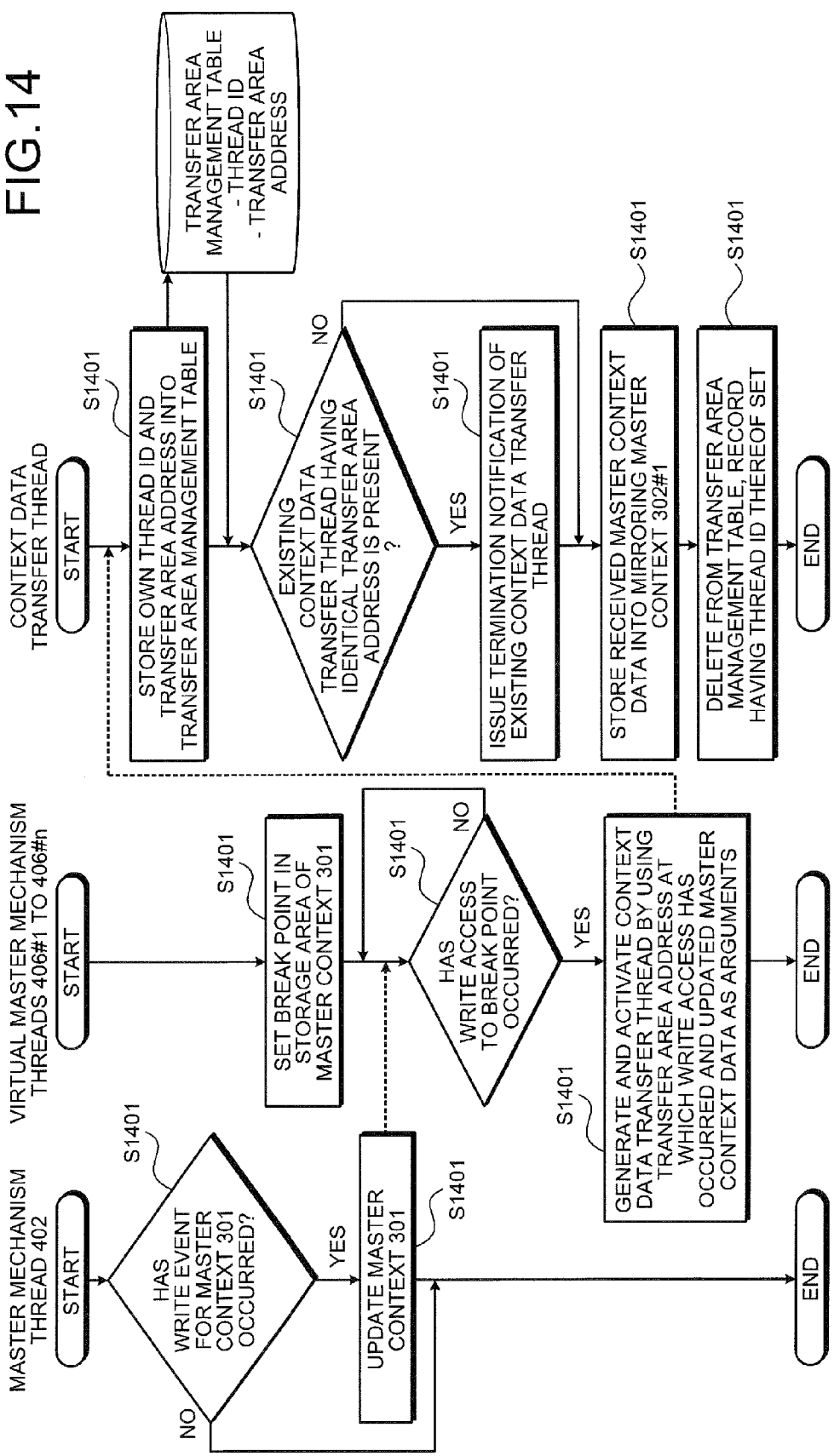

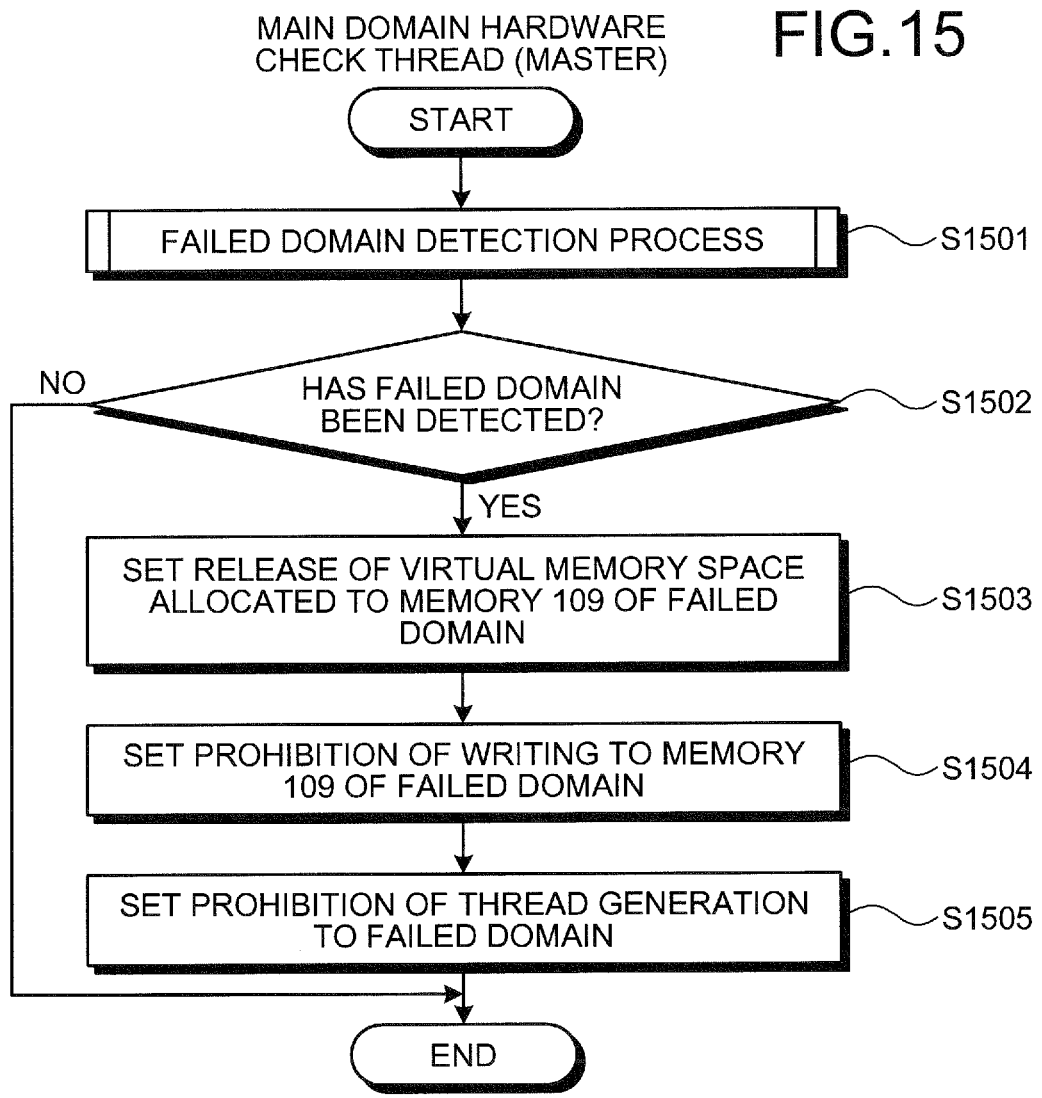

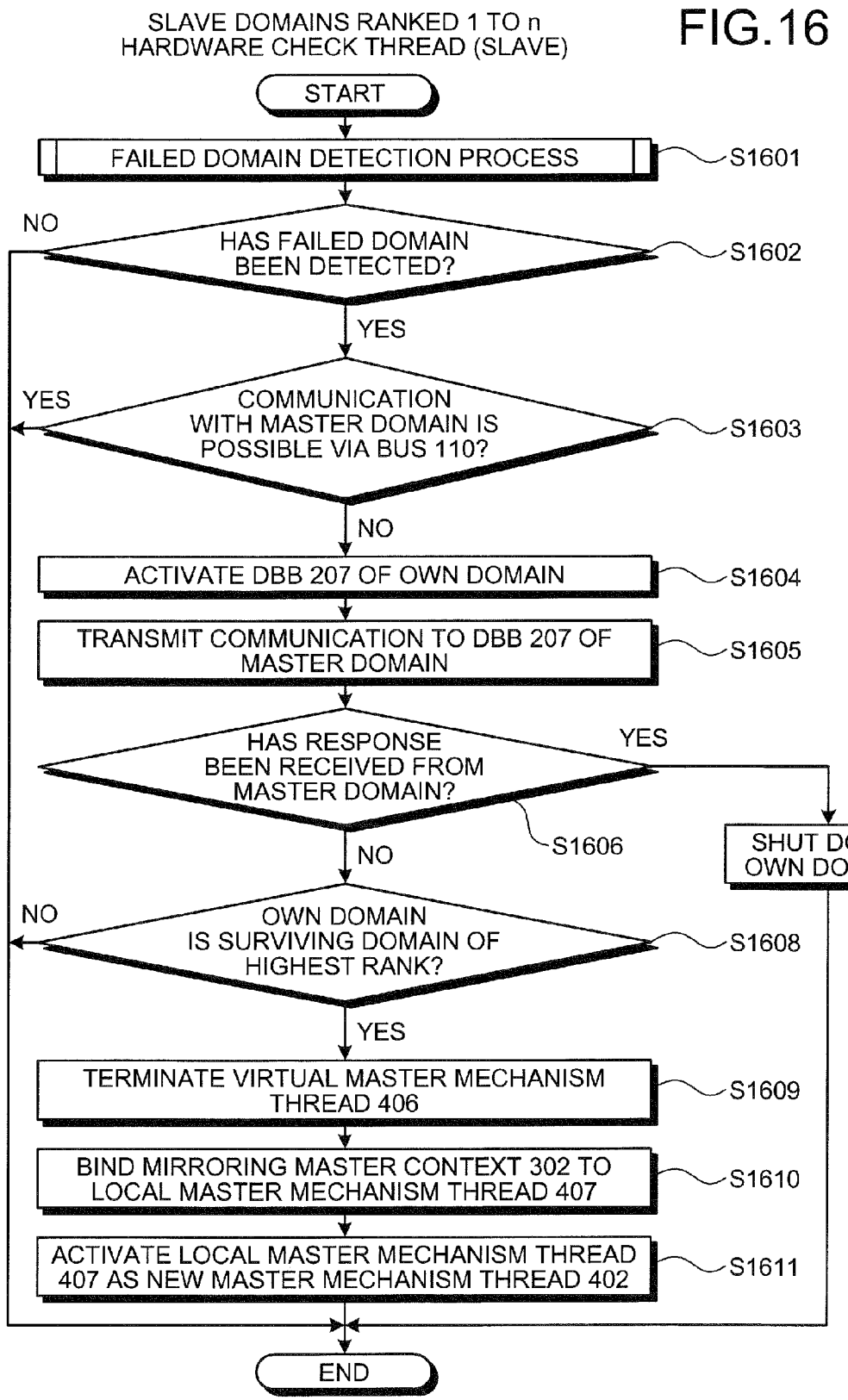

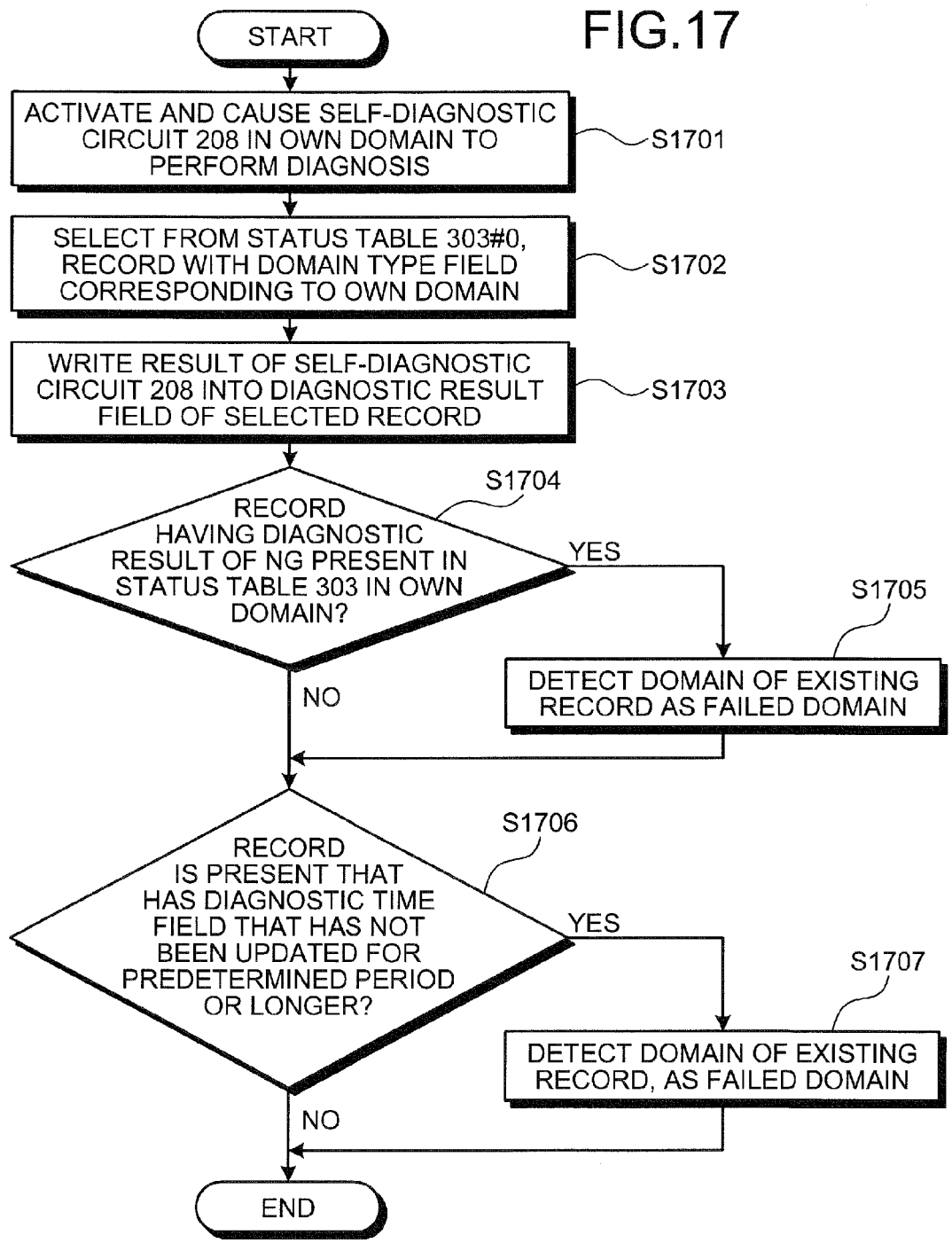

PROCESSOR MANAGEMENT METHOD

CROSS REFERENCE TO RELATED APPLICATIONS

This application is a continuation application of International Application PCT/JP2011/053732, filed on Feb. 21, 2011 and designating the U.S., the entire contents of which are incorporated herein by reference.

FIELD

The embodiments discussed herein are related to a processor management method of managing multiple processors.

BACKGROUND

Recently, portable terminals such as mobile phones have a wider range of uses and more abundant functions. Thus, performance requirements for portable terminals are increasing. Disclosed as a technology capable of providing a highly functional portable terminal is a technology in which a portable terminal can be separated unit by unit, e.g., into an image I/O unit and a voice receiving unit (see, e.g., Japanese Laid-Open Patent Publication Nos. 2005-176371 and 10-228458). This enables the user to enjoy highly functional services such as viewing images while speaking by phone.

A technique is disclosed in which for a portable terminal having dockable units, the units are connectable via a bus to devices (see, e.g., Japanese Examined Patent Publication No. H6-66057). Disclosed is a technique having a self-diagnostic circuit that diagnoses an abnormality or a failure in each of the units of the portable terminal (see, e.g., Japanese Laid-Open Patent Publication No. H3-217137).

In the above technologies, however, requirements for high performance lead to the necessity of high-performance processors being provided in the units, incurring increased cost. For example, the portable terminal separable into plural units requires a backup process as a result of separation into plural units and the arrangement of plural high-performance processors when performing function mirroring, which increases the cost.

SUMMARY

According to an aspect of an embodiment, a processor management method includes setting a master mechanism in a given processor among plural processors, where the master mechanism manages the processors; setting a local master mechanism and a virtual master mechanism in each of processors other than the given processor among the processors, where the local master mechanism and the virtual master mechanism manage each of the processors; and notifying by the master mechanism, the processors of an offset value of an address to allow a shared memory managed by the master mechanism to be accessed as a continuous memory by the processors.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B are explanatory views of operations before and after failure of a system 100 according to an embodiment;

FIG. 2 is a block diagram of hardware of the system 100;

FIG. 4 is a block diagram of software of the system 100;

FIG. 9 is an explanatory view of an example of storage contents of a status table 303;

FIG. 14 is a flowchart of a master context transfer process 2;

FIG. 15 is a flowchart of a process of a hardware check thread (master);

FIG. 16 is a flowchart of a process of a hardware check thread (slave); and

FIG. 17 is a flowchart of a failed domain detection process.

DESCRIPTION OF EMBODIMENTS

Figure 3:
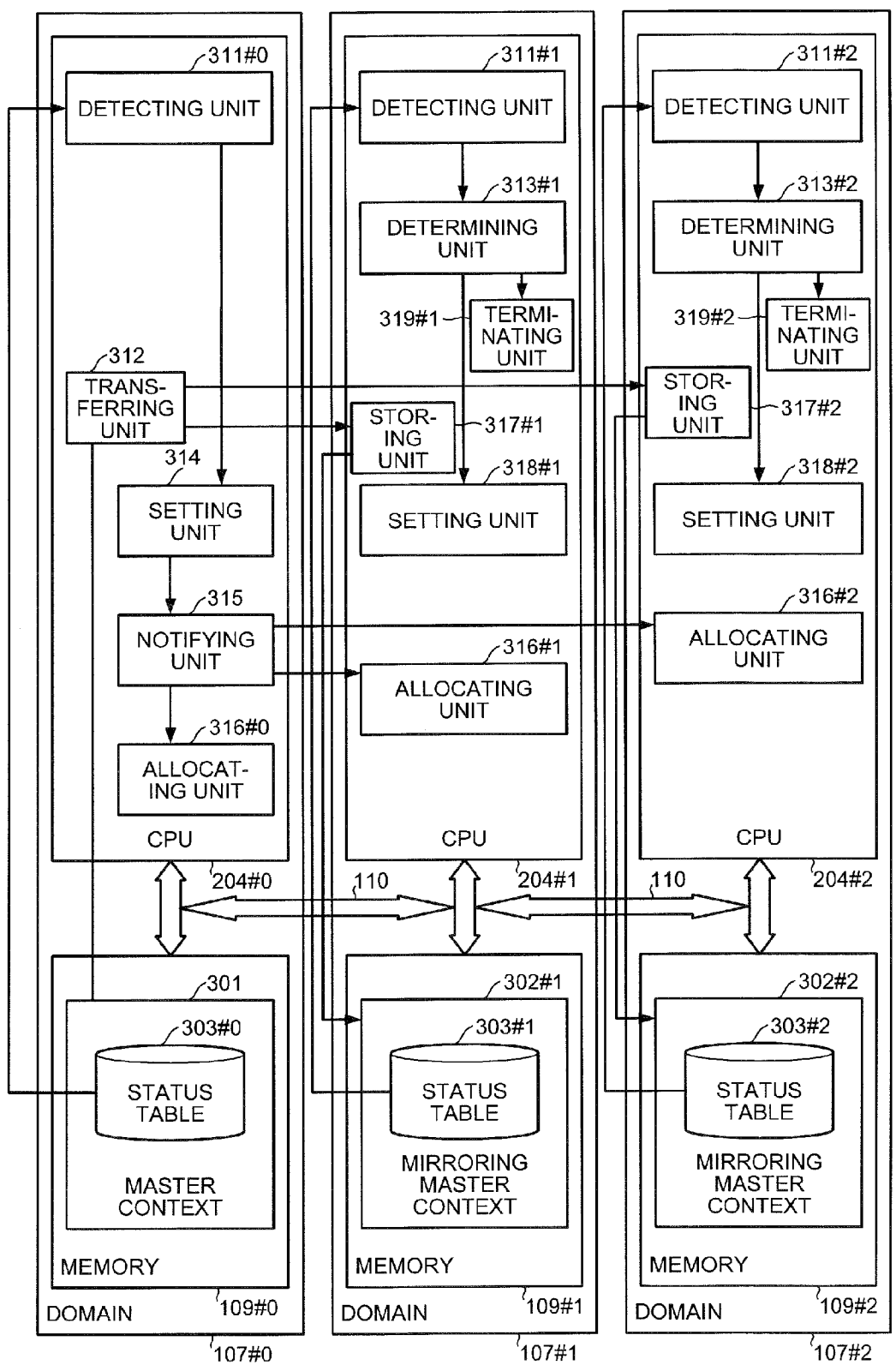
FIG. 3 is a block diagram of functions of the system 100.

An embodiment of a processor management method will be described in detail with reference to the accompanying drawings. In the description below, a system adopting the processor management method will be described.

FIGS. 1A and 1B are explanatory views of operations before and after failure of a system 100 according to the present embodiment. FIG. 1A depicts the state before failure of the system 100, which has plural processors, and FIG. 1B depicts the state after the failure.

FIG. 1A will be described first. The system 100 includes a display unit 103 and a keyboard unit 104. The display unit 103 includes a display 105. The keyboard unit 104 includes a keyboard 106.

The system 100 is separated according to domain. Each of the domains can be independently operated as a single computer system. For example, the display unit 103 includes a domain 107#0 and the keyboard unit 104 includes domains 107#1 and 107#2. Hereinafter, hardware having suffix symbols "#0" to "#2" indicate that the hardware is included in a corresponding domain 107. Similarly, software having "#0" to "#2" indicates that it is software executed by a central processing unit (CPU) in a corresponding domain 107.

The domain 107 includes a system-on-a-chip (SoC) 108 and memory 109. For example, the domain 107#0 includes an SoC 108#0 and memory 109#0, the domain 107#1 includes an SoC 108#1 and memory 109#1, and the domain 107#2 includes an SoC 108#2 and memory 109#2. The details of the domain 107, the SoC 108, and the memory 109 will be described later with reference to FIG. 2. The SoC 108 is assumed to be a simple SoC implementing a simple mobile phone function. Due to the simple SoC, the cost of the SoC 108 can be kept low.

The domains 107#0 to 107#2 are connected via a bus 110. For example, a flexible cable may be employed as the bus 110. The connection method of the domains 107#0 to 107#2 may be wireless. For example, the domains 107#0 to 107#2 may each include a near field communications unit prescribed by the IEEE802.15.1 standard so that inter-domain communication is performed by the near field communications units.

The domains 107#0 to 107#2 execute an OS that provides one computer system to the user virtually, thereby enabling the system 100 to include three domains. For example, when one CPU is in each of the SoCs 108#0 to 108#2, the system 100 is a system 100 having three CPUs.

FIG. 1 assumes that the CPU in the domain 107#0 is provided with a master mechanism managing the system 100 and that the CPUs in the domains 107#1 and 107#2 are provided with local master mechanisms managing the domains 107#1 and 107#2, respectively.

The memory 109#0 to 109#2 has offset values from physical addresses set so as to form a continuous shared memory space. Specific offset values will be described later with reference to FIG. 4. Due to the offset values, the logical address of the memory 109#0 becomes 0x000 to 0x0ff, the logical address of the memory 109#1 becomes 0x100 to 0x1ff, and the logical address of the memory 109#2 becomes 0x200 to 0x2ff. Finally, each memory 109#0 to 109#2 can provide the logical addresses 0x000 to 0x2ff for the domains.

In this manner, by connecting plural domains even though the memory size of each domain is small, the system 100 can provide a wider range of addresses for each of the domains. The system 100 is allowed to use a wide range of addresses and can activate multiple applications (hereinafter, "apps") at the same time so that high-performance service can be provided to the user.

The domains 107#0 to 107#2 mutually diagnoses one another. For example, the domain 107#0 diagnoses the domains 107#1 and 107#2, the domain 107#1 diagnoses the domains 107#0 and 107#2, and the domain 107#2 diagnoses the domains 107#0 and 107#1. Accordingly, when a failure occurs in one of the domains 107#0 to 107#2, the other domains can detect the failure. A specific diagnostic method will be described later with reference to FIG. 9. In FIG. 1A, the domains 107#0 to 107#2 operate normally and thus, the diagnostic results are all OK.

FIG. 1B will be described. The system 100 depicted in FIG. 1B is in a state where a joint between the display unit 103 and the keyboard unit 104 breaks due to an impact force, etc. applied to the system 100. The system 100 is further in a state where the SoC 108#1 fails due to impact. As a result of the failure of the SoC 108#1, the domain 107#1 is inoperable as a computer system. As no break has occurred in the bus 110, communication between the domains 107#0 and 107#2 remains possible.

The diagnostic result of the domain 107#1 is "NG" and information of the occurrence of the failure is detected through the diagnosis by the domain 107#0 or through the diagnosis by the domain 107#2. The system 100 receiving the detection switches the operation from 3-domain operation to 2-domain operation, thereby enabling the system 100 to continue to be used while minimizing the restriction of functions and performance at the time of the occurrence of the failure.

FIG. 2 is a block diagram of hardware of the system 100. In FIG. 2, the system 100 includes the display 105, the keyboard 106, the domains 107#0 to 107#2, flash read only memory (ROM) 201, a flash ROM controller 202, and flash ROM 203. The domain 107#0 includes a CPU 204#0, a peripheral device 205#0, a power control circuit 206#0, a digital baseband (DBB) 207#0, a self-diagnostic circuit 208#0, and the memory 109#0. Although the system 100 of FIG. 2 includes three domains, the system 100 may include two or more domains.

The memory 109#0 and the CPU 204#0 to the self-diagnostic circuit 208#0 are connected together via a SoC internal bus 209#0. Similarly, the domain 107#1 includes the memory 109#1 and a CPU 204#1 to a self-diagnostic circuit 208#1 that are connected via an SoC internal bus 209#1. The domain 107#2 includes the memory 109#2 and a CPU 204#2 to a self-diagnostic circuit 208#2 that are connected via an SoC internal bus 209#2.

In the domain 107#0, the SoC 108#0 includes the CPU 204#0 to the DBB 207#0, with the self-diagnostic circuit 208#0 and the memory 109#0 being outside the SoC 108#0. The same applies to the domains 107#1 and 107#2. Although hardware included in the domain 107#0 will hereinafter be described, hardware included in the domains 107#1 and 107#2 have also identical functions.

The CPU 204#0 provides overall control of the system 100. The peripheral device 205#0 indicates a peripheral device other than the CPU 204#0. For example, the peripheral device 205#0 may be a graphics processing unit (GPU) or a direct memory access controller (DMAC). The peripheral device 205#0 may be a controller that controls the display 105, etc.

The power control circuit 206#0 is a circuit that controls power to the CPU 204#0, the peripheral device 205#0, and the DBB 207#0. The power control circuit 206#0 may control power to the self-diagnostic circuit 208#0 and the memory 109#0 lying outside the SoC 108#0. For example, when the peripheral device 205#0 is not in use, the power control circuit 206#0 may stop power supplied to the peripheral device 205#0.

The DBB 207#0 is a telephone communication device that executes communication or telephone communication functions. For example, the DBB 207#0 has a function of identifying a communication counterpart and a function of imparting an error control code to data. The DBB 207#0 is connected, through a communication line, to a network such as a local area network (LAN), a wide area network (WAN) or Internet and is connected to other devices by way of the network. The DBB 207#0 is communicable with DBBs 207#1 and 207#2.

The self-diagnostic circuit 208#0 is a circuit that has a function of diagnosing whether the devices in the domain 107#0 operate normally. For example, the self-diagnostic circuit 208#0 measures the current, voltage, and temperature in the SoC 108#0 and, when detecting an abnormal value, provides a diagnosis of NG as output.

A case of detecting an abnormal value of the current and voltage is for example when the electric circuit is short-circuited by a force to the domain 107#0 or by an internal degradation of the devices and, in such a case, current exceeding the design value may flow to the domain 107#0. A case of detecting an abnormal value of the temperature is when the CPU 204#0 thermally runs away due to software running in the domain 107#0. The self-diagnostic circuit 208#0 detects such a state and provides a diagnosis of NG as output.

The memory 109#0 is a storage device capable of storing data. For example, the memory 109#0 is the ROM, a random access memory (RAM), etc. For example, the ROM stores a program such as a boot program. The RAM is used as a work area of the CPU 204#0. The SoC internal bus 209#0 connects the CPU 204#0 with the memory 109#0 as a work area and is preferably high-speed transferable, to achieve full performance of the CPU 204#0.

The display 105 displays a cursor, icons, and a toolbox in addition to data such as a document, an image, or function information. The display 105 can be for example a thin film transistor (TFT) liquid crystal display. The keyboard 106 has keys for the input of letters, numerals, various instructions, etc. and performs data input. The keyboard 106 may be in the form of a touch-panel type input pad or a ten-key pad.

The flash ROM 201 is a flash ROM with a high readout speed and is for example a NOR-type flash memory. The flash ROM 201 stores system software such as an operating system (OS) or an app. For example, when updating an OS, the system 100 receives a new OS by way of the DBB 207 and updates an old OS stored in the flash ROM 201 to the received new OS.

The flash ROM controller 202 controls the reading and writing of data with respect to the flash ROM 203 under the control of the CPUs 204#0 to 204#2. The flash ROM 203 is a flash ROM primarily for data storage and portability, and is, for example, a NAND-type flash memory. The flash ROM 203 stores data written thereto under the control of the flash ROM controller 202. An example of the data stored may be image data or video data that is acquired through the DBB 207 by the user of the system 100 or a program executing a processor management method of the present embodiment. The flash ROM 203 can be for example a memory card or an SD card.

Functions of the system 100 will be described. FIG. 3 is a block diagram of functions of the system 100. The system 100 includes a detecting unit 311, a transferring unit 312, a determining unit 313, a setting unit 314, a notifying unit 315, an allocating unit 316, a storing unit 317, a setting unit 318 and a terminating unit 319. These functions (the detecting unit 311 to the terminating unit 319) as a control unit are implemented by the CPUs 204#0 to 204#2 executing a program stored in a storage device. The storage device is for example the memory 109, the flash ROM 201 and 203, etc. depicted in FIGS. 1A, 1B, and 2.

In FIG. 3, the CPU 204#0 is assumed to control the entire system 100. Thus, in FIG. 3, the CPUs 204#0 to 204#2 are assumed to execute the detecting unit 311 and the allocating unit 316 among the functional units. It is assumed that the CPU 204#0, which controls the entire system 100, executes the transferring unit 312, the setting unit 314, and the notifying unit 315. It is assumed that the CPUs 204#1 and 204#2 execute the determining unit 313, the storing unit 317, the setting unit 318, and the terminating unit 319. Accordingly, if the CPU 204#1 controls the entire system 100, the CPU 204#1 may have the transferring unit 312, the setting unit 314, and the notifying unit 315.

The system 100 can access a master context 301 and a mirroring master context 302 that are stored in the memory 109. The master context 301 stores an information group required at the time of the operation of the system 100. For example, the master context 301 stores system boot information, time information, setting information of the peripheral device 205, an offset value allocated to the memory 109, context information of an important process, etc. The mirroring master context 302 stores the same contents as the master context 301. The mirroring master context 302 is maintained to store the same contents as the master context 301 by the functions of the transferring unit 312 and the storing unit 317.

A status table 303 is stored in the master context 301 and in the mirroring master context 302. The status table 303 stores a diagnostic time and a diagnostic result as diagnostic information of the domain. The details of the status table 303 will be described later with reference to FIG. 9.

The detecting unit 311 has a function of detecting failure of the other domains 107. For example, detecting units 311#0 to 311#2 may request the self-diagnostic circuit 208 in another domain 107 to execute a diagnosis and acquire the diagnostic result to detect a failure of the other domain 107. The detecting unit 311 may write a time stamp or appended information to context data of the master mechanism at a predetermined cycle to detect failure based on the time stamp or the appended information.

For example, the detecting units 311#0 to 311#2 write to the status table 303#0 every one minute, a diagnostic time and a diagnostic result of the diagnosis of the respective domains thereof. After the writing, the detecting units 311#0 to 311#2 detect failure based on the diagnostic time and the diagnostic result of the status table 303 in the respective domains. The contents written to the status table 303#0 are stored to the status table 303 of the corresponding domain by a function of the storing unit 317.

For example, when a given domain whose diagnostic time has elapsed for the predetermined cycle or more is present, the detecting units 311#0 to 311#2 detect a failure of the given domain. Alternatively, when a given domain is present whose diagnostic result is NG, the detecting units 311#0 to 311#2 detect a failure of the given domain. The diagnostic result may be stored in a storage area such as a register, cache memory, or the memory 109 of the CPU 204 having the function of the detecting unit 311.

The transferring unit 312 has a function of transferring updated context data to processors other than a processor among the plural processors. For example, the transferring unit 312 notifies the CPUs 204#1 and 204#2 of updated data for the master context 301 and the updated address. The notified result may be stored to a storage area such as the register, the cache memory, or the memory 109#0 of the CPU 204#0.

The determining unit 313 has a function of determining that the CPU is in a state to manage plural processors when failure is detected by the detecting units 311#1 and 311#2. For example, when a failure is detected and there is no response from the master mechanism, the determining unit 313#2 determines that one of the CPUs executing the local master mechanism is in the state to manage plural processors. The determining unit 313 may rank the CPUs executing the local master mechanism and determine the CPU of the highest rank as being in the state to manage the plural processors.

The determining unit 313 may notify the master mechanism to determine whether the failure is a failure of the master mechanism. For example, the determining unit 313#2 determines that there exists a possibility of a failure of the master mechanism, depending on whether a response is received from the CPU 204#0 set in the master mechanism by way of the bus 110.

If there is no response from the master mechanism to a notice, the determining unit 313 may attempt to determine whether the connection to the master mechanism has been lost by contacting a telephone communication device that can be controlled by the master mechanism. For example, when no response is received from the CPU 204#0 by way of the bus 110, the determining unit 313 attempts to post the DBB 207#0 to determine whether the connection to the master mechanism has been lost. The diagnostic result may be stored in a storage area such as the register, the cache memory, or the memory 109 of the CPU 204 having the function of the determining unit 313.

The setting unit 314 has a function of setting a master mechanism managing plural processors in a given processor among the plural processors. For example, the setting unit 314 sets the master mechanism in the CPU 204#0 of the domain 107#0, among the CPUs 204#0 to 204#2. The CPU having the master mechanism set therein executes a master mechanism thread.

The setting unit 314 sets in each of processors other than the given processor, a local master mechanism and a virtual master mechanism that manage the processor. For example, the setting unit 314 sets the local master mechanism and the virtual master mechanism in the CPUs 204#1 and 204#2, among the CPUs 204#0 to 204#2. The CPU having the local master mechanism set therein executes a local master mechanism thread. Similarly, the CPU having the virtual master mechanism set therein executes a virtual master mechanism thread.

When a failure is detected by the detecting unit 311#0, the setting unit 314 performs setting to stop at least some of the processes. For example, for a domain for which a failure is detected, the setting unit 314 sets a release of a memory space allocated to the memory 109 of the domain. The setting unit 314 further sets an inhibit of write to the memory 109 of the domain and sets an inhibit of generation of a thread for the domain. The set information is stored to a storage area such as the memory 109 or the flash ROM 201.

The notifying unit 315 has a function of notifying plural processors of address offset values by the master mechanism so that a shared memory managed by the master mechanism is accessed as a continuous memory from the plural processors. For example, assume that the physical addresses of the memory 109#0 to 109#2 range from 0x00 to 0xff. In this case, the notifying unit 315 notifies the CPU 204#0 of an offset value 0, notifies the CPU 204#1 of an offset value 0x100, and notifies the CPU 204#2 of an offset value 0x200. The offset values are stored to the memory 109 managed by the CPU receiving the notification. The offset values may be stored in a storage area such as the register, the cache memory, or the memory 109#0 of the CPU 204#0 as the notification source.

The allocating unit 316 has a function of allocating the shared memory to a memory area managed by the local master mechanism based on the offset values after the notification of the offset values by the notifying unit 315.

For example, the allocating unit 316#0 adds the notified offset value 0 to the physical addresses of the memory 109#0 to allocate 0x000 to 0x0ff as the logical addresses of the memory 109#0. Similarly, the allocating unit 316#1 adds the notified offset value 0x100 to the physical addresses of the memory 109#1 to allocate 0x100 to 0x1ff as the logical addresses of the memory 109#1. The allocating unit 316#2 adds the notified offset value 0x200 to the physical addresses of the memory 109#2 to allocate 0x200 to 0x2ff as the logical addresses of the memory 109#2. Information of the execution of the allocation may be stored to a storage area such as the register, the cache memory, or the memory 109 of the CPU 204 having the function of the allocating unit 316.

The storing unit 317 has a function of storing context data transferred from the transferring unit 312 into a memory area managed by the local master mechanism. For example, a storing unit 317#1 stores updated context data into a mirroring master context 302#1.

When detecting a breakpoint set in the master mechanism, the storing unit 317 may store context data of the master mechanism into a memory area managed by the local master mechanism. For example, when detecting a write access to the breakpoint set in the master context 301, the storing unit 317#1 stores updated context data into the mirroring master context 302#1.

The storing unit 317 may suspend a first thread that stores context data into a memory area, if the execution of a second thread that stores further updated context data is detected, before the execution of the first thread.

For example, the first thread is assumed to store to the mirroring master context 302#1, context data updated for an address 0x040. In this case, the storing unit 317#1 suspends the process of the first thread if the execution of the second thread is detected, the second thread storing context data further updated for the address 0x040 to the mirroring master context 302#1. The storage execution result may be stored to a storage area such as the register, the cache memory, or the memory 109 of the CPU 204 having the function of the storing unit 317.

The setting unit 318 has a function of setting the local master mechanism as a new master mechanism when the determining unit 313 determines that the corresponding CPU is in a state to manage plural processors. For example, when the CPU 204#1 is determined to be in a state to manage the CPUs 204#0 to 204#2, a setting unit 318#1 sets the local master mechanism executed by the CPU 204#1 as a new master mechanism. The setting result may be stored to a storage area such as the register, the cache memory, or the memory 109 of the CPU 204 having the function of the setting unit 318.

The terminating unit 319 has a function of terminating the operation of a processor set in the local master mechanism when the determining unit 313 determines a disconnection from the master mechanism. For example, when a disconnection from the CPU 204#0 is determined, a terminating unit 319#2 shuts down the CPU 204#2 to terminate the operation. The objects to be shut down may be all the devices in a domain including the processors set in the local master mechanism. The operation termination history may be stored in a storage area such as the flash ROM 201.

As described above, the system 100 includes the detecting unit 311 that among a set of domains that include the processors and the storage areas, detects a failure of a specific domain that controls the system 100, via another domain than the specific domain among the set of domains. The system 100 includes the transferring unit 312 that transfers to a storage area of another domain each time the control result is updated, a context of the system stored in the storage area of the specific domain. The system 100 includes the setting unit 318 that, when the detecting unit 311 detects a failure of the specific domain, uses the context transferred to the storage area of the other domain by the transferring unit 312 and sets another domain as a new specific domain controlling the system.

FIG. 4 is a block diagram of software of the system 100. The system 100 executes the software of FIG. 4 using the hardware depicted in FIG. 2. The CPU 204#0 executes, as the software provided by the OS, a kernel 401#0, a master mechanism thread 402#0, an OS managing unit 403, a communication liaison unit 404, and a scheduler 405. The CPU 204#1 executes a kernel 401#1, a virtual master mechanism thread 406#1, a local master mechanism thread 407#1, and the OS managing unit 403. Similarly, the CPU 204#2 executes a kernel 401#2, a virtual master mechanism thread 406#2, a local master mechanism thread 407#2, and the OS managing unit 403. The OS managing unit 403 includes a process managing unit 408 and a memory managing unit 409.

The system 100 executes processes 410 to 413 as apps to provide services to the user by utilizing the function of the OS. The CPU 204#0 executes the process 410, the CPU 204#1 executes the processes 411 and 412, and the CPU 204#2 executes the process 413.

The kernel 401 is a program that controls the CPUs 204#0 to 204#2. The kernel 401 is a core function of the OS and, for example, manages resources of the system 100 so that the software such as the threads can access the hardware.

The kernel 401 sets any one of the CPUs 204#0 to 204#2 as a master CPU to activate a master mechanism thread 402 therein and activates a virtual master mechanism thread 406 and a local master mechanism thread 407 in the other CPUs.

In the following description, the domain 107 including the CPU executing the master mechanism thread 402 is defined as a master domain while the domains 107 including the CPUs executing the local master mechanism thread 407 are defined as slave domains.

The kernel 401 ranks a group of slave domains. For example, the kernel 401 sets the domain 107#1 as a slave domain ranked 1 and sets the domain 107#2 as a slave domain ranked 2. For the master domain setting and the slave domain setting among the domains 107, any domain 107 among the domains 107#0 to 107#2 may be a master domain. For example, the master domain may be set by a designer at the time of the design. The system 100 may set, as the master domain, the domain 107 displaying a main menu on the display 105.

The SoC internal bus 209 has a higher speed than the bus 110. In this manner, the kernel 401 provides the system 100 in the form of a virtual multi-core processor system to the user. The system 100 acting as one virtual multi-core processor system by the kernel 401 is in the form of a distributed memory type multi-core processor system whose CPUs each have dedicated memory.

The master mechanism thread 402 is a program that controls the operations of the entire system 100. For example, the master mechanism thread 402 performs initialization of the peripheral devices 205#0 to 205#2, the display 105, the keyboard 106, the flash ROM controller 202, etc. and performs time setting. The master mechanism thread 402 stores in the master context 301, boot information and time information of the system 100, information of the peripherals 205#0 to 205#2, etc., or the result of execution by the OS managing unit 403.

The OS managing unit 403 has an intra-domain 107 local function for providing the system 100 as a computer system. To fulfill the above function, the OS managing unit 403 includes the process managing unit 408 and the memory managing unit 409. For example, the CPU 204#0 executes a process managing unit 408#0 and a memory managing unit 409#0. Similarly, the CPU 204#1 executes a process managing unit 408#1 and a memory managing unit 409#1 and the CPU 204#2 executes a process managing unit 408#2 and a memory managing unit 409#2.

The communication liaison unit 404 is a function executed by the master domain and acts to perform a communication function in liaison with the DBB 207 of the domain thereof. In the example of FIG. 4, the communication liaison unit 404 executes the communication function in liaison with the DBB 207#0. The DBBs 207 of the other domains are not in use and therefore are not supplied with power.

The scheduler 405 has a function of determining processes to be allocated to the domains 107#0 to 107#2 in the system 100. A process is a unit into which a program is divided for execution by the CPU. For example, the scheduler 405 allocates the process 410 to the domain 107#0, allocates the processes 411 and 412 to the domain 107#1, and allocates the process 413 to the domain 107#2.

The virtual master mechanism thread 406 has a function of mirroring a master context updated by the master mechanism thread 402 to the memory 109 of the domain thereof. The mirroring may be in the form of the two methods below. A first processing method includes synchronizing the domains 107 and notifying the slave domains of an updated portion by the master domain. A second processing method includes notifying the slave domains of an updated portion by the master domain without synchronizing the domains 107 and thereafter, proceeding to other processing to allow the notified slave domain to reflect the updated portion. The details of master context transfer processes 1 and 2 will be described later with reference to FIGS. 13 and 14.

The local master mechanism thread 407 is a thread that performs management of the interior of the slave domain. For example, the local master mechanism threads 407#1 and 407#2 execute and record, as a log, the processing contents notified from the master mechanism thread 402#0.

The master mechanism thread 402 and the local master mechanism thread 407 receive a notice of the diagnostic OK from the self-diagnostic circuit 208 and notify the master mechanism thread 402 or the local master mechanism thread 407 of the other domains, that the domain thereof is in operation. The master mechanism thread 402 and the local master mechanism thread 407 further determine whether the other domains are diagnostic OK.

For example, the master mechanism thread 402 and the local master mechanism thread 407 activate a hard check thread that causes the self-diagnostic circuit 208 to periodically execute the diagnosis. The hard check thread sets a domain receiving the diagnostic OK from the self-diagnostic circuit 208 as a surviving domain. The hard check thread sets as a failed domain a domain receiving the diagnosis of NG from the self-diagnostic circuit 208 or a domain whose diagnosis is not yet executed by the self-diagnostic circuit 208 after the elapse of a predetermined cycle. A specific diagnostic determination method of the other domains will be described later with reference to FIG. 9.

The process managing unit 408 has a function of managing a process allocated to the domain 107. The operation mode of the process managing unit 408 includes a master mode and a slave mode. The process managing unit 408 operating in the slave mode manages the generation, execution, and termination of the process allocated to the domain thereof. The process managing unit 408#0 operating in the master mode manages resources such as the hardware of the system 100 in addition to the functions operating in the slave mode.

For example, the process managing unit 408#1 operating in the slave mode allocates the processes 411 and 412 allocated to the domain 107#1 to the CPU 204#1 according to time sharing. The process managing unit 408#0 operating in the master mode gives an access privilege to the process 413 for accessing the flash ROM controller 202, for example.

The memory managing unit 409 has a function of providing the memory 109#0 to 109#2 as a shared virtual memory space 414 to the processes 410 to 413. For example, the physical addresses of the memory 109#0 to 109#2 are assumed to range from 0x00 to 0xff.

In this case, the memory managing unit 409#0 provides to the process 410, the logical address of the memory 109#0 as being from 0x000 to 0x0ff, obtained by adding an offset value±0 to the physical address of the memory 109#1. The memory managing unit 409#0 provides to the process 410, the logical address of the memory 109#1 as being from 0x100 to 0x1ff, obtained by adding an offset value +0x100 to the physical address of the memory 109#1.

The memory managing unit 409#0 provides to the process 410, the logical address of the memory 109#2 as being from 0x200 to 0x2ff, obtained by adding an offset value +0x200 to the physical address of the memory 109#1. As a result, the memory managing unit 409#0 can provide to the process 410, the shared virtual memory space 414 with the logical address ranging from 0x000 to 0x2ff.

Similarly, the memory managing units 409#1 and 409#2 also provide the logical address of the memory 109#0 as being values that are obtained by adding an offset value ±0 to the physical address to the processes 410 to 413. Subsequently, the memory managing units 409#1 and 409#2 provide the logical address of the memory 109#1 as being values that are obtained by adding an offset value +0x100 to the physical address to the processes 410 to 413. Lastly, the memory managing units 409#1 and 409#2 provide the logical address of the memory 109#2 as being values that are obtained by adding an offset value +0x200 to the physical address to the processes 410 to 413.

Thus, the memory managing units 409#1 and 409#2 can also provide to the processes 410 to 413, the shared virtual memory space 414 with the logical address ranging from 0x00 to 0x2ff.

In the case of setting the offset value, for example, the memory managing unit 409 sets the logical address of the memory 109 of the master domain to an address starting from 0x00. If the physical address of the memory 109 of the master domain starts from an address greater than 0x00, the memory managing unit 409 sets an offset value resulting in the logical address 0x00. The memory managing unit 409 then sets the offset value for the logical address of the memory 409 in the slave domain ranked 1 to an end address of the logical address of the memory 109 in the master domain. Thereafter, the memory managing unit 409 sets the offset value for the logical address of the memory 109 in a slave domain ranked n to an end address of the logical address of the memory 109 in a slave domain ranked n−1. n is an integer greater than or equal to 1.

With reference to FIGS. 5A to 8B, description will be given of detecting operations and restoration operations utilizing the software functions depicted in FIG. 4 when one of the domains 107 is damaged.

Figure 5A:
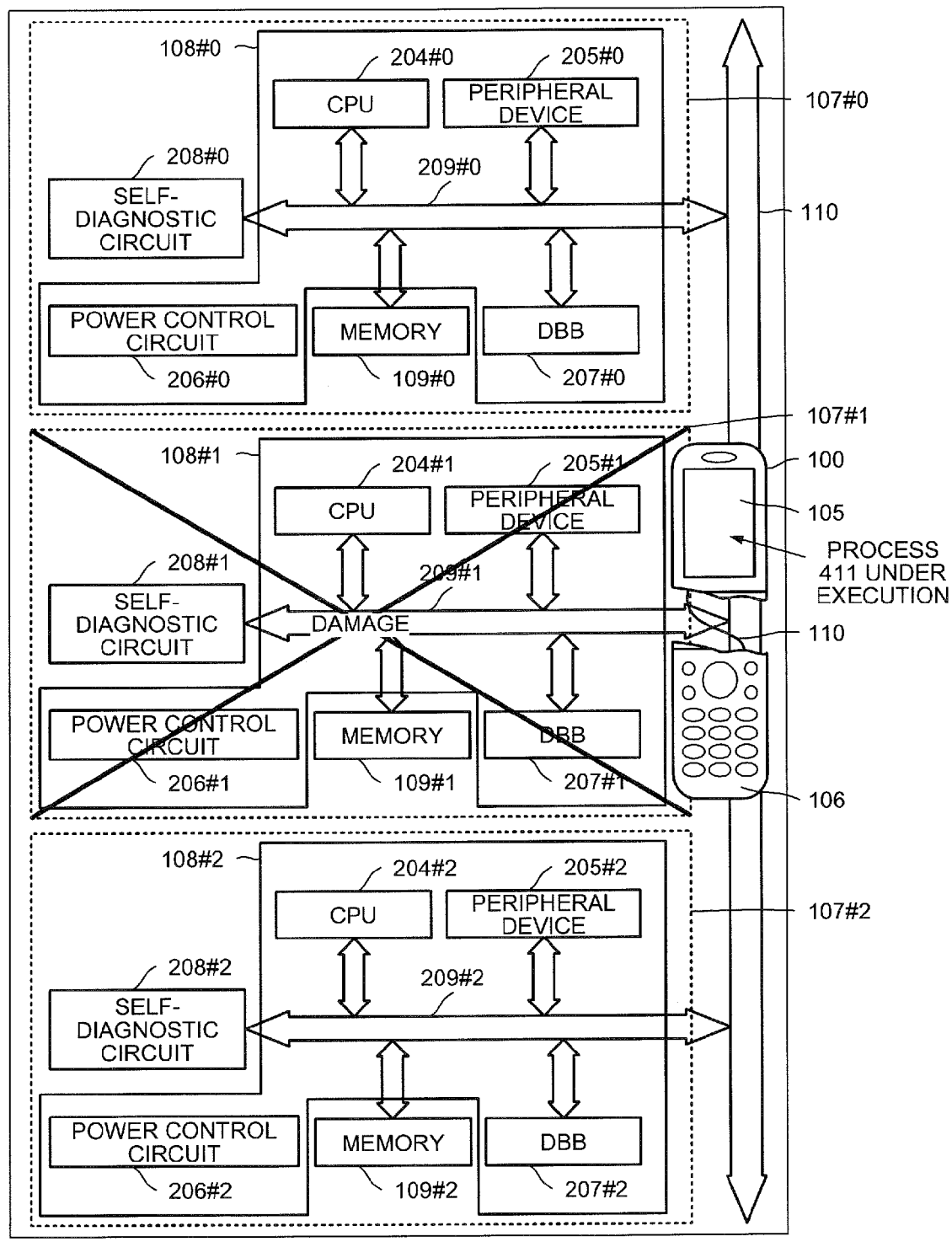
FIGS. 5A and 5B are explanatory views of a failed-domain detecting operation when a slave domain is damaged.
Figure 5B:
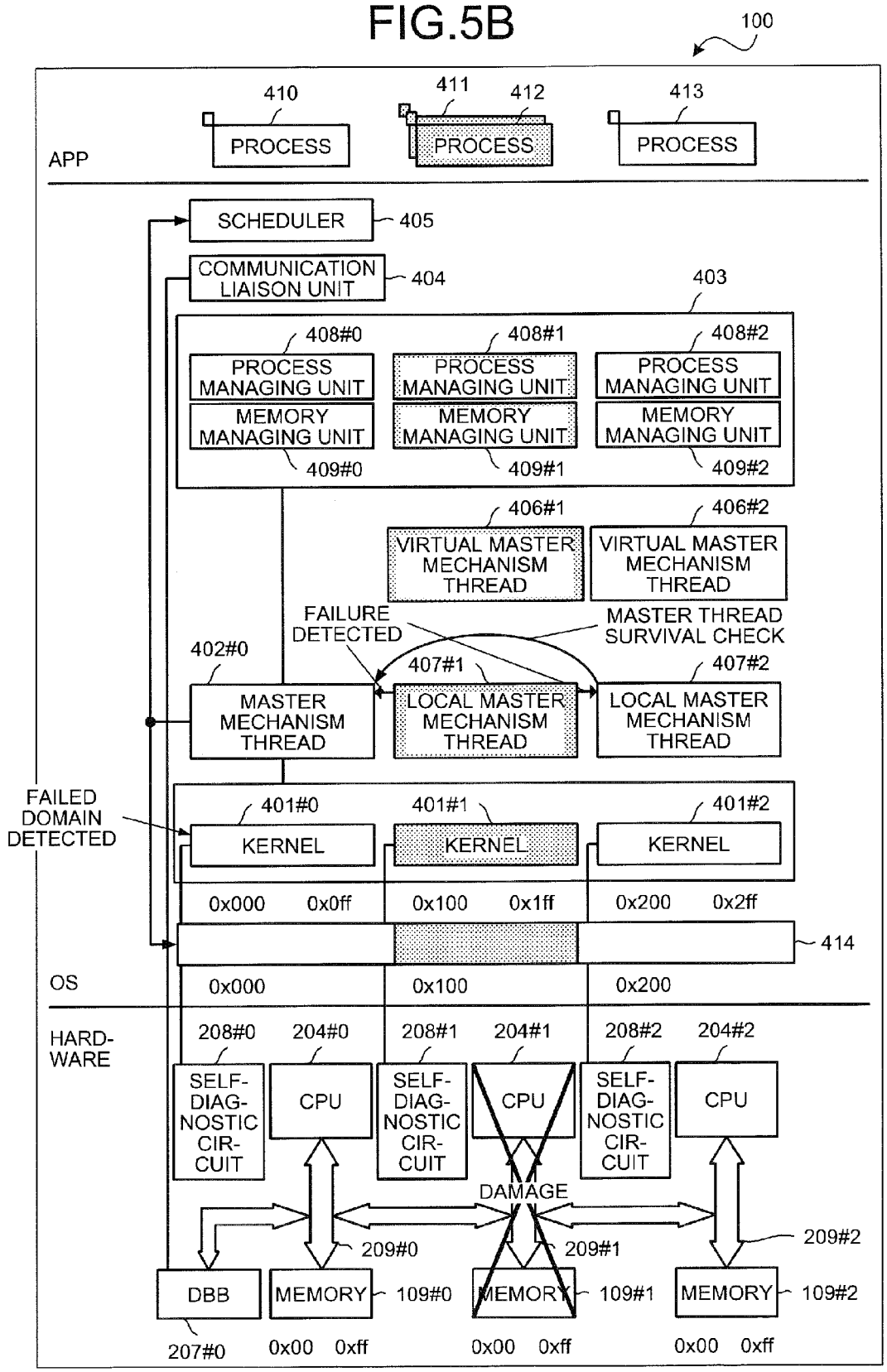

FIGS. 5A and 5B are explanatory views of a failed-domain detecting operation when a slave domain is damaged. FIG. 5A depicts a state where the system 100 breaks down. In FIG. 5A, the system 100 is in a state where the domain 107#1 acting as the slave domain is damaged when a screen created by the process 411 appears on the display 105.

Figure 6A:
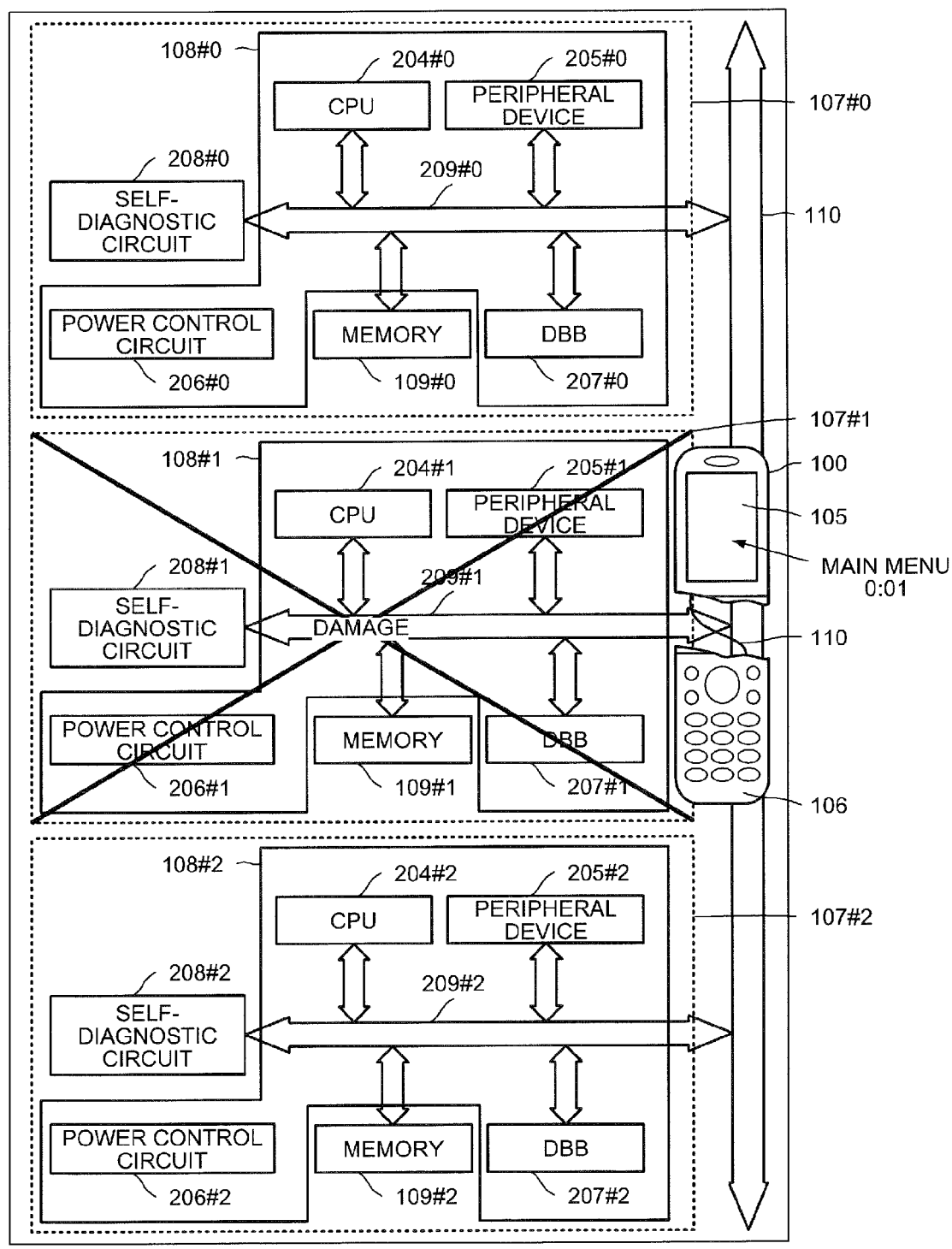
FIGS. 6A and 6B are explanatory views of a restoration operation performed after damage of the slave domain.
Figure 6B:
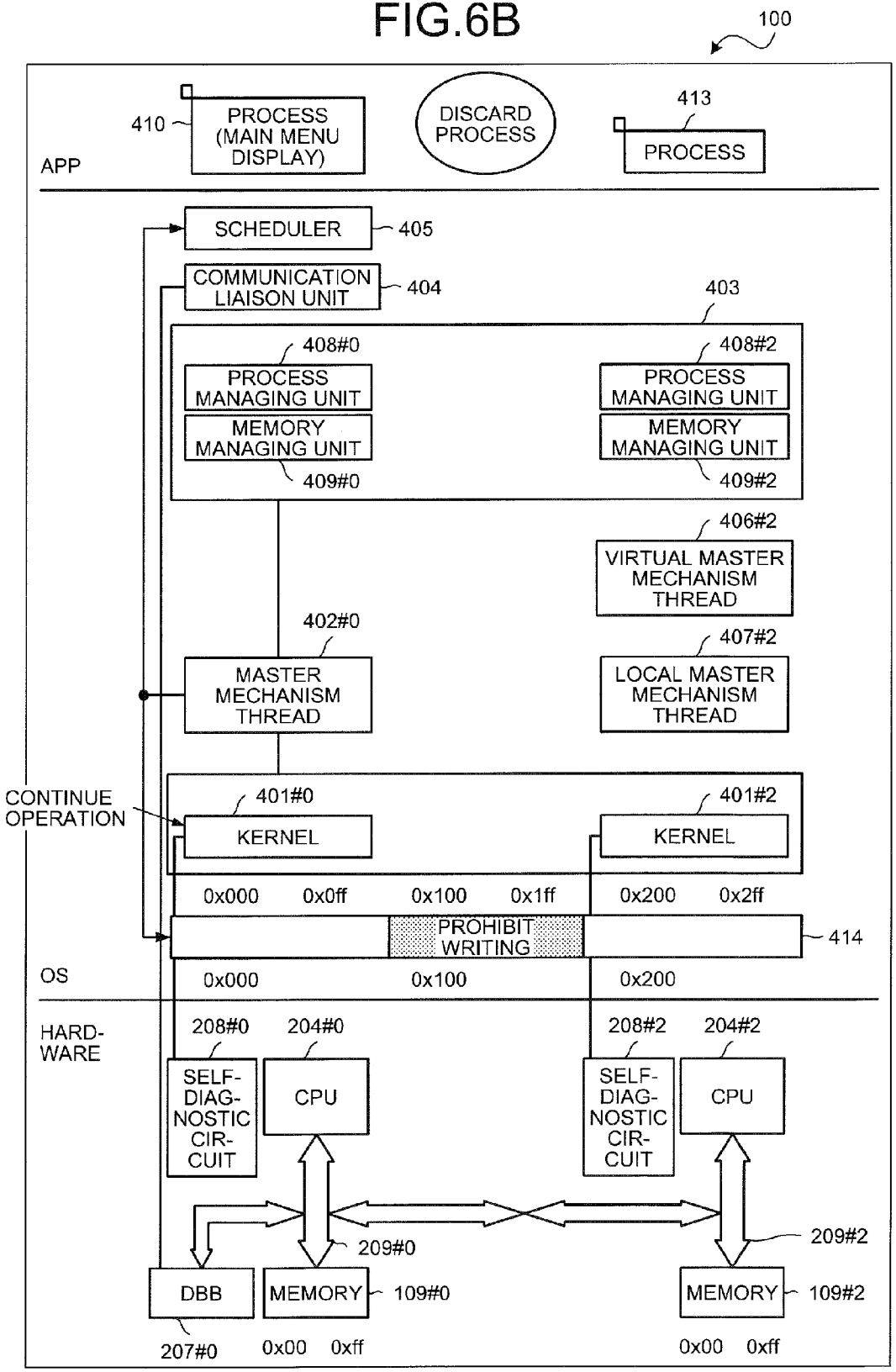

At this time, the master mechanism thread 402#0 and the local master mechanism thread 407#2 of FIG. 5B detect that the domain 107#1 has failed. After the detection, the local master mechanism thread 407#2 belonging to the slave domain checks, via the bus 110, whether the master domain is a surviving domain. In the system 100 of FIG. 5A, since the domain 107#0, which is the master domain, has survived, the local master mechanism thread 407#2 terminates the processing upon the failed domain detection and continues ordinary processing. When detecting the damaged domain 107#1 as a failed domain, the master mechanism thread 402#0 belonging to the master domain shifts to a restoration operation. In FIGS. 6A and 6B, the restoration operation performed after the slave domain damage will be described.

FIGS. 6A and 6B are explanatory views of the restoration operation performed after the damage of the slave domain. The system of FIG. 6A is in a state where the master mechanism thread 402#0 belonging to the master domain detects that the domain 107#1, as the slave domain, is damaged and has failed. After the detection, the master mechanism thread 402#0 sets the logical address 0x100 to 0x1ff of the memory 109#1 belonging to the domain 107#1, to a write inhibit.

By setting the logical address to the write inhibit, for example, when the domain 107#1 fails as a result of runaway software, the system 100 can prevent memory breakdown caused by the runaway software and a clearing of memory caused by the automatic reset. Reading from the memory 109#1 is permitted, thereby enabling software running in a surviving domain to read data output to the memory 109#1 by software not running away in the domain 107#1, for example.

As a result, the processing of the software running in the surviving domain can be continued.

The master mechanism thread 402#0 then executes a thread creation inhibit process for the failed domain. The thread creation inhibit process for the failed domain continues until the failed domain is repaired. This enables the system 100 to continue two-domain operations. For example, it is possible for the user to perform operations such as taking a unit including a damaged domain of the system 100 in for repair while continuing to run the system 100 by a remaining unit. In the example of FIG. 6A, the system 100 terminates the process 411 depicted in FIG. 5A and displays the main menu on the display 105.

Figure 7A:
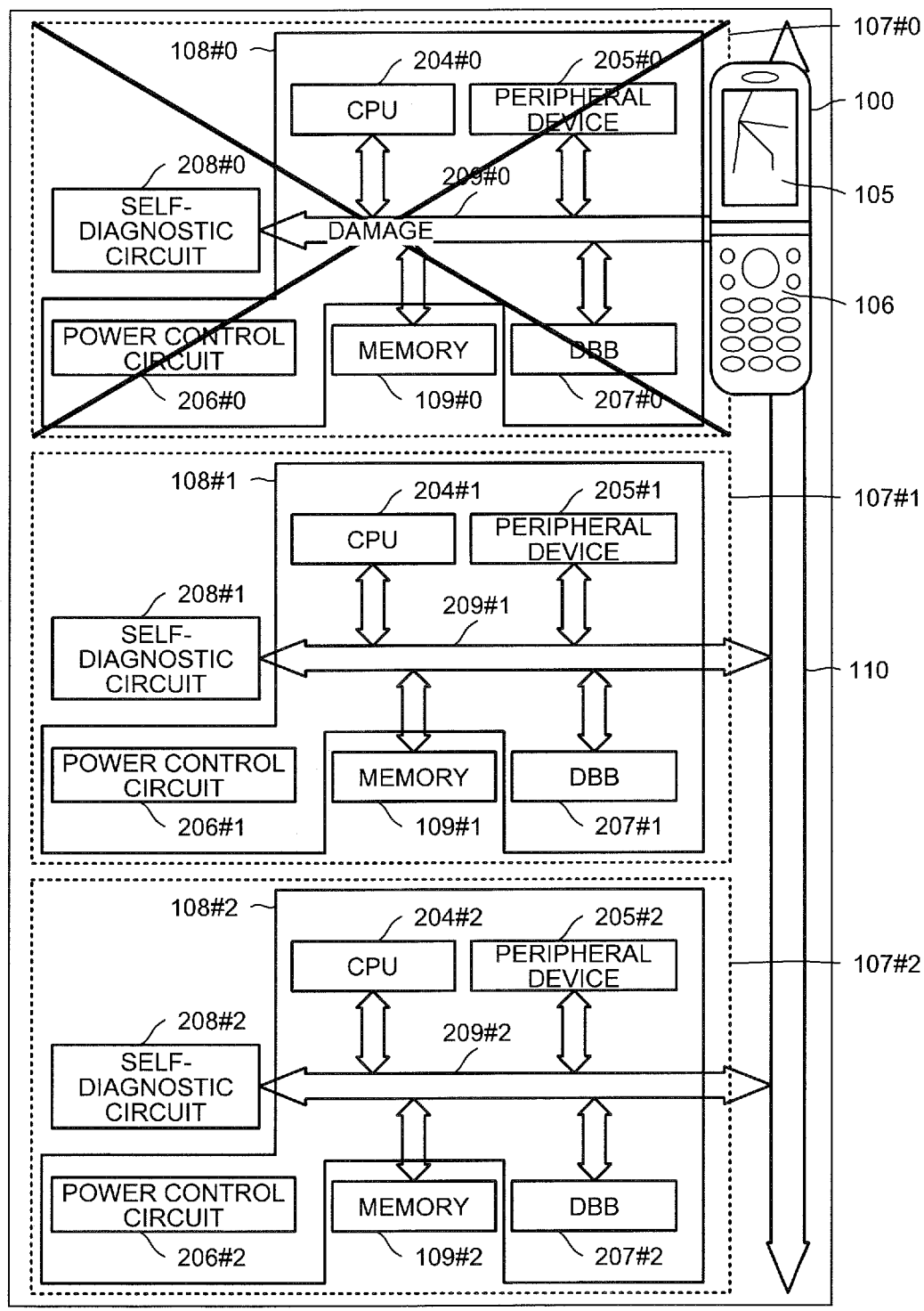
FIGS. 7A and 7B are explanatory views of operations upon a master domain damage.
Figure 7B:
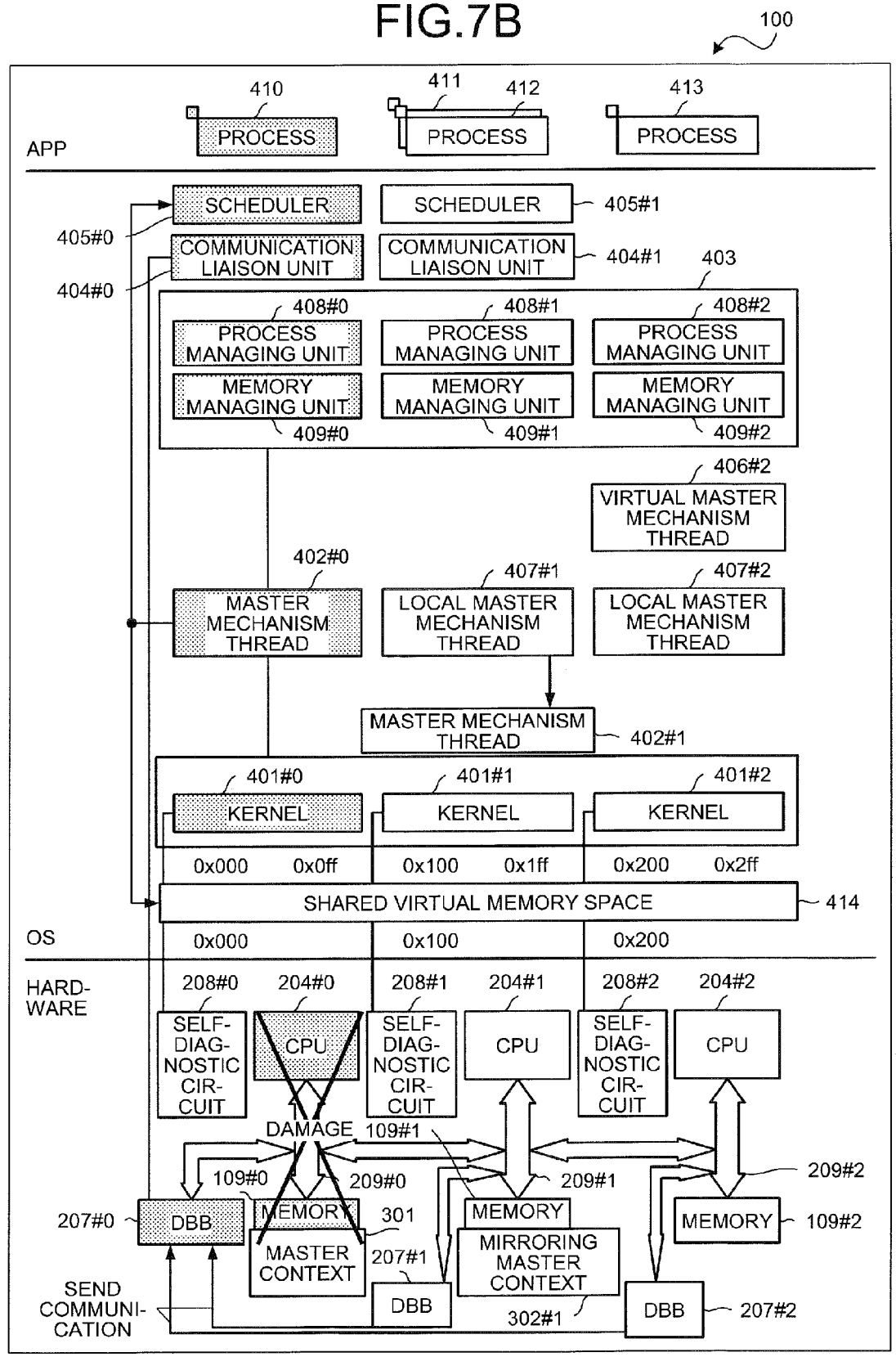

FIGS. 7A and 7B are explanatory views of operations upon a master domain damage. The system 100 of FIG. 7A is in a state where the domain 107#0, which is the master domain, is damaged due to a force applied to the display unit 103.

In this case, the local master mechanism threads 407#1 and 407#2 depicted in FIG. 7B detect that the domain 107#0 has failed as a result of the damage of the domain 107#0. After the detection, the local master mechanism threads 407#1 and 407#2 perform respective survival checks of the master domain, via the bus 110. In the system 100 depicted in FIG. 7B, the domain 107#0, which is the master domain, is damaged and thus, the survival checks via the bus 110 fail.

The local master mechanism threads 407#1 and 407#2 then perform the master domain survival checks using the DBB 207. This enables the system 100 to determine whether communication with the master domain is infeasible due to breaking of the bus 110.

In a specific survival check using the DBB 207, the local master mechanism thread 407#1 causes the DBB 207#1 to post the DBB 277#0. The local master mechanism thread 407#1 determines that the master domain has survived if a response to the post is received and determines that the master domain is damaged if no response to the post is received. Similarly, the local master mechanism thread 407#2 causes the DBB 207#2 to post the DBB 277#0 to perform the master domain survival check.

Since the domain 107#0, which is the master domain, is damaged in the system 100 depicted in FIG. 7B, the DBB 207#0 cannot respond to the post from the DBBs 207#1 and 207#2. Accordingly, the local master mechanism threads 407#1 and 407#2 determine that the master domain is damaged. After the determination, the domain 107#1 having the highest slave domain rank acts as a new master domain to continue the operations.

For example, the local master mechanism thread 407#1 terminates the virtual master mechanism thread 406#1 and sets the mirroring master context 302#1 as a new master context to which the local master mechanism thread 407#1 provides output. The local master mechanism thread 407#1 then executes the boot processing using the local master mechanism thread 407#1 as the master mechanism thread 402#1. This enables the system 100 to set the domain 107#1, which is a slave domain, to be the master domain to continue the operations.

Figure 8A:
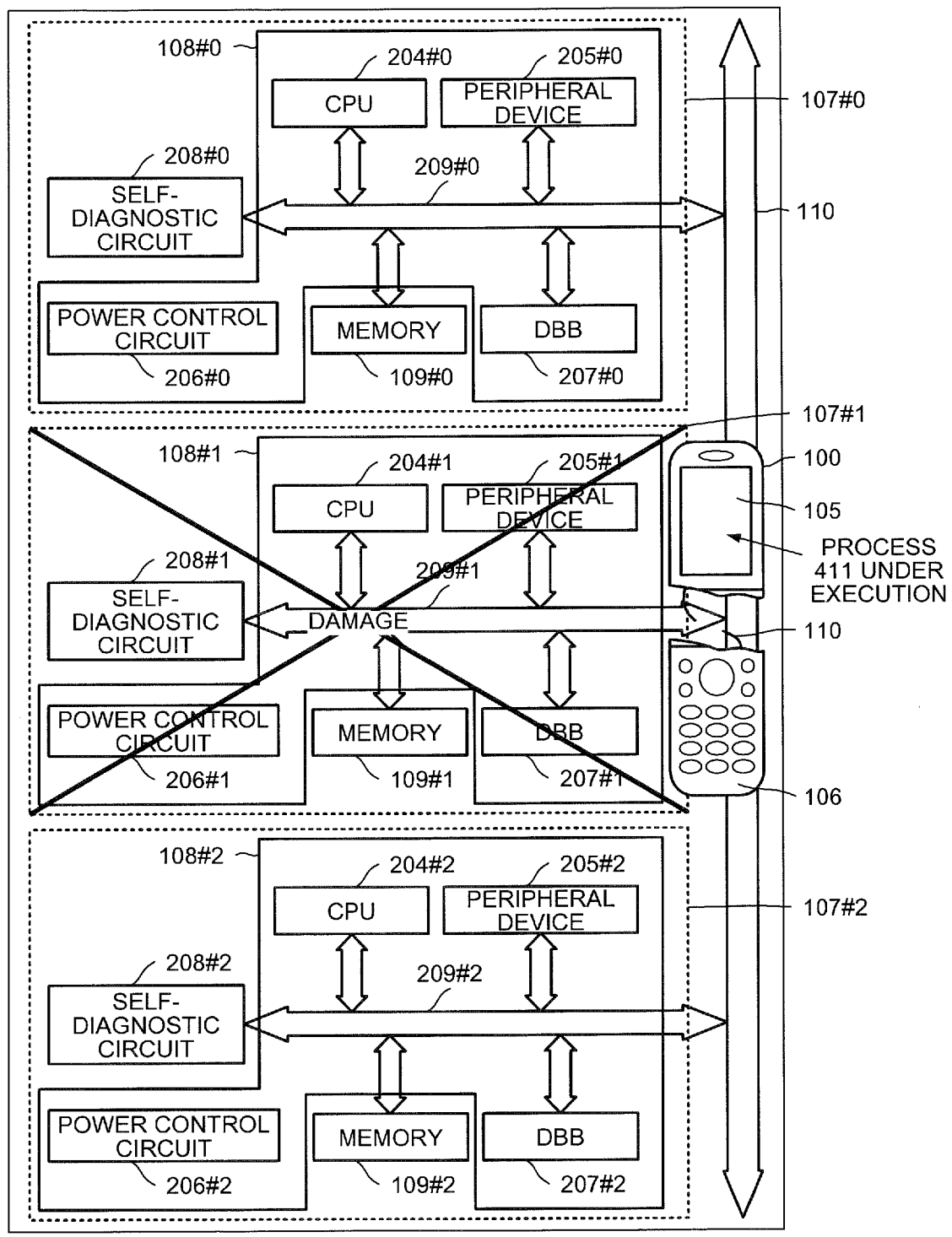
FIGS. 8A and 8B are explanatory views of operations in a case of independent failures.
Figure 8B:
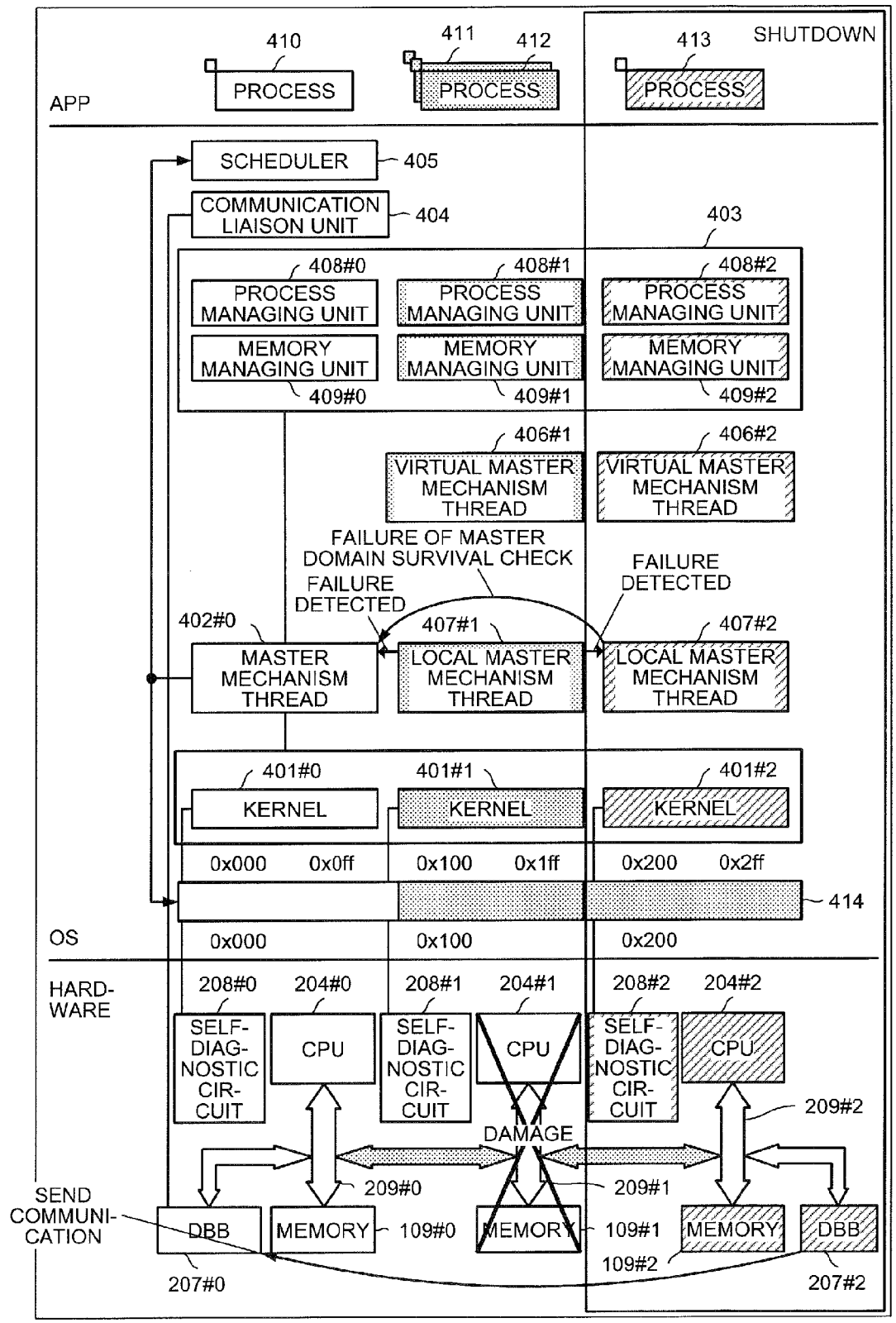

FIGS. 8A and 8B are explanatory views of operations in the case of independent failures. The system 100 of FIG. 8A is in the state where the domain 107#1, as the slave domain, and the bus 110 are damaged. In FIG. 8A, the bus 110 is a wire and has broken. If the bus 110 is wireless, the system 100 of FIG. 8A is assumed to be in a state where the near field communications unit is broken and consequently, the domain-to-domain communication is infeasible.

In this case, the master mechanism thread 402#0 and the local master mechanism thread 407#2 depicted in FIG. 8B detect that the domain 107#1 has been damaged. After the detection, the local master mechanism thread 407#2 belonging to the slave domain checks, via the bus 110, whether the master domain has survived. In the example depicted in FIG. 8B, although the domain 107#0 acting as the master domain is alive in the system 100, the local master mechanism thread 407#2 cannot verify the survival of the domain 107#0 due to the breaking of the bus 110 and determines that it is not alive. The local master mechanism thread 407#2 then performs a master domain survival check using the DBB 207#2.

Since the domain 107#0 acting as the master domain is alive in the system 100 of FIG. 8B, a response to the post to the DBB 207#2 is possible. Accordingly, the local master mechanism thread 407#2 determines that the master domain is alive. As a result, the local master mechanism thread 407#2 determines that communication with the master domain is infeasible due to the breaking of the bus 110. In this state, the domain 107#2 cannot receive an instruction from the domain 107#0 that is acting as the master domain and therefore, shuts down to terminate the operations.

The master domain and the bus 110 may possibly have a failure, resulting in a separate state. For example, in the state depicted in FIG. 8B, the domain 107#1 is assumed to be set as the master domain, the domain 107#0 is assumed to be set to the slave domain ranked 1, and the domain 107#2 is assumed to be set to the slave domain ranked 2. In this case, the domain 107#0 with the slave domain ranked 1 becomes a new master domain to re-execute the boot processing. Upon the re-booting, the domain 107#0 cannot communicate with the domain 107#2, which is the slave domain ranked 2, and thus the latter is disconnected from the system 100 at the time of the boot processing.

FIG. 9 is an explanatory view of an example of storage contents of a status table 303. The status table 303 depicted in FIG. 9 represents a state after the current time of 12:34:00. The status table 303 includes three fields including a domain type, a diagnostic time, and a diagnostic result. The domain type field stores a master domain or a slave domain as a type of the domain 107 and also stores a slave domain rank in the case of a slave domain. The domain type field may store any value as long as the domain 107 can uniquely be identified and therefore may store the identification (ID) of the domain 107.

The diagnostic time field stores a time of diagnosis of the self-diagnostic circuit 208. The diagnostic result field stores a diagnostic result from the self-diagnostic circuit 208. For example, the system 100 is assumed to perform diagnosis with the self-diagnostic circuit 208 every one minute, which is a predetermined period. In this state, the status table 303 depicted in FIG. 9 indicates that the self-diagnostic circuit 208 of the master domain diagnoses the master domain at 12:34:00 and that the diagnostic result is OK. Similarly, the status table 303 also indicates that at 12:34:00, the self-diagnostic circuit 208 of the slave domain ranked 1 diagnoses the slave domain ranked 1 and that the diagnostic result is OK. The status table 303 also indicates that at 12:33:00, the self-diagnostic circuit 208 of the slave domain ranked 2 diagnoses the slave domain ranked 2 and that the diagnostic result is OK.

Since the slave domain ranked 2 is not diagnosed at 12:34: 00, the master domain and the slave domain ranked 1 detect that the slave domain ranked 2 has failed. Although not depicted in FIG. 9, as a result of diagnosis of the self-diagnostic circuit 208, a diagnostic result may be NG and NG may be entered in the diagnostic result field. In such a case, other domains detect, as a failed domain, a domain for which NG is entered in the diagnostic result field.

Figure 10:
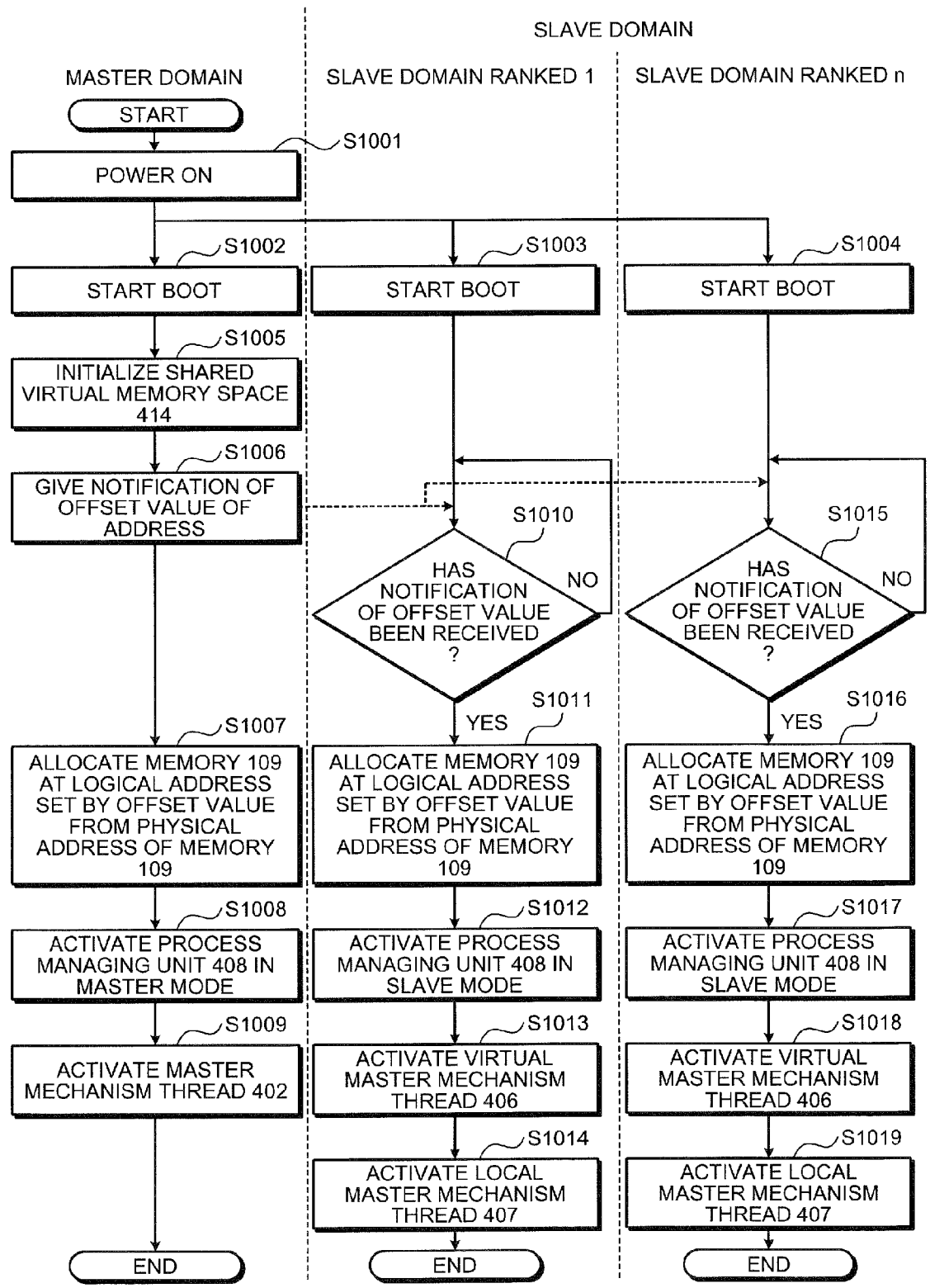
FIG. 10 is a flowchart of a start process.

FIG. 10 is a flowchart of a start process. When powered on (step S1001), the system 100 starts booting the master domain and the slave domains ranked 1 to n (steps S1002 to S1004). Subsequently, the master domain executes steps S1005 to S1009; the slave domain ranked 1 executes steps S1010 to S1014; and the slave domain ranked n executes steps S1015 to S1019. The operations at steps S1015 to S1019 are equivalent to the operations at steps S1010 to S1014 and therefore will not be described.

The master domain initializes the shared virtual memory space 414 (step S1005). The master domain gives notification of an offset value of an address (step S1006). The master domain allocates the memory 109 at a logical address set by the offset value from the physical address of the memory 109 (step S1007). The master domain activates the process managing unit 408 in the master mode (step S1008), activates the master mechanism thread 402 (step S1009), and terminates the start process. After termination of the start process, the master domain transitions to an operation time process.

The slave domain ranked 1 determines whether notification of the offset value has been received (step S1010). If notification of the offset value has not been received (step S1010: NO), the slave domain ranked 1 executes the operation at step S1010 again. If the notification of the offset value has been received (step S1010: YES), the slave domain ranked 1 allocates the memory 109 at a logical address set by the offset value from the physical address of the memory 109 (step S1011). The slave domain ranked 1 activates the process managing unit 408 in the slave mode (step S1012).

The slave domain ranked 1 activates the virtual master mechanism thread 406 (step S1013), activates the local master mechanism thread 407 (step S1014), and terminates the start process. After termination of the start process, the slave domain ranked 1 transitions to an operation time process.

The master domain and the slave domains terminating the start process transition to the operation time process. The operation time process of the master domain and the slave domains will be described with reference to FIGS. 11 and 12. The master domain executes the operation time process with a function of the master mechanism thread 402. Similarly, the slave domains execute the operation time process with functions of the local master mechanism thread 407 and the virtual master mechanism thread 406.

Figure 11:
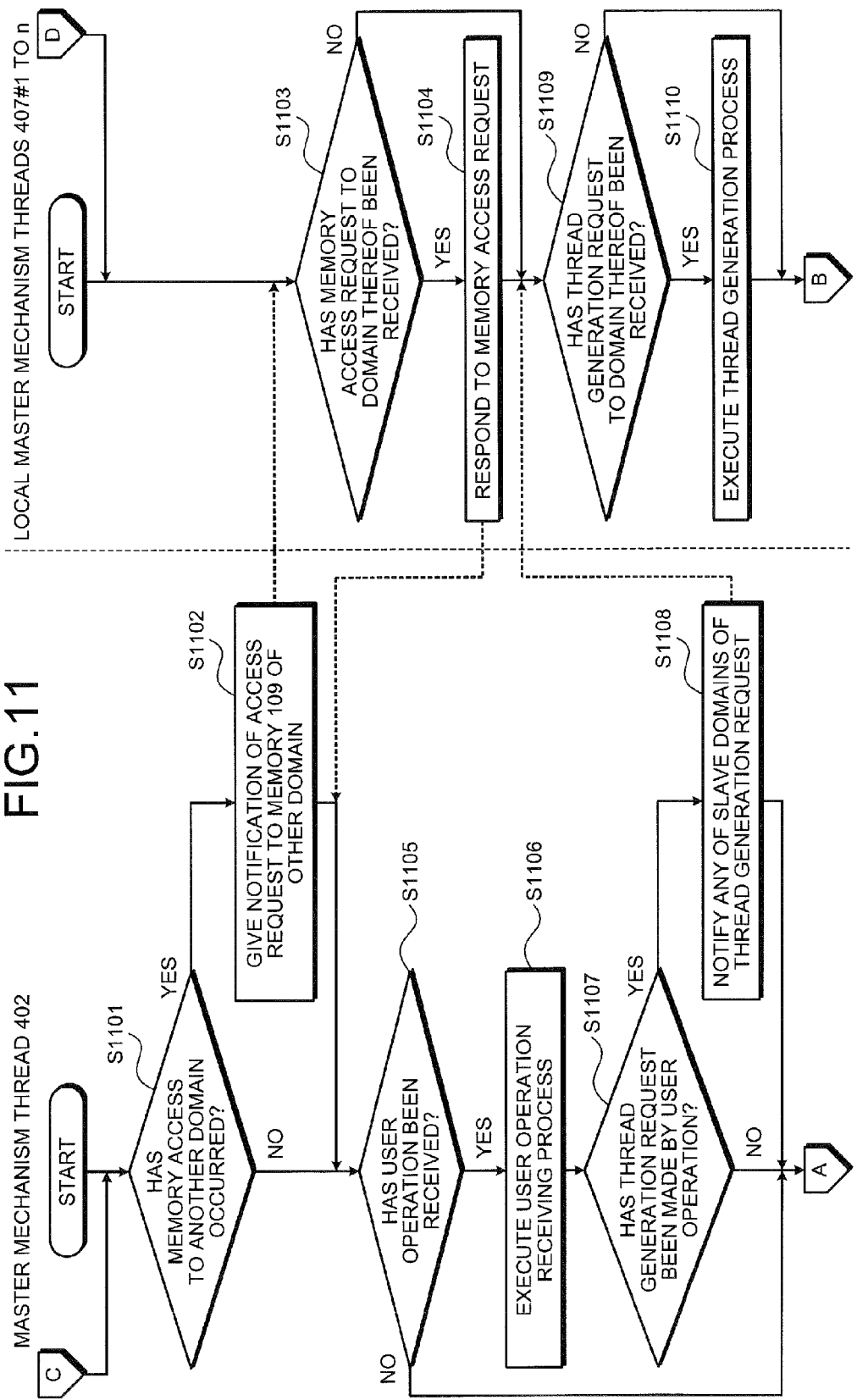
FIG. 11 is a flowchart (part 1) of an operation time process of the master domain and the slave domains.
Figure 12:
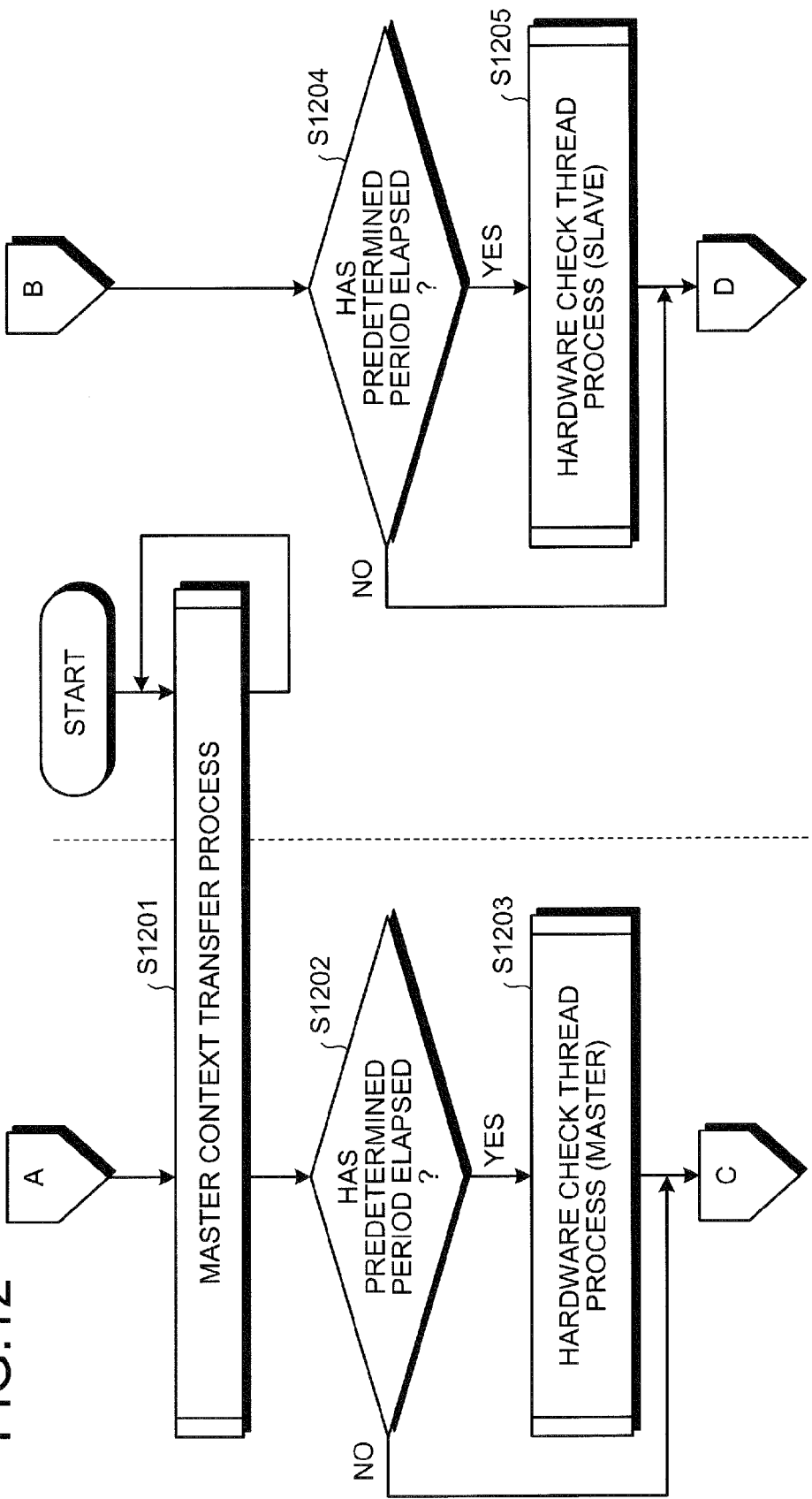
FIG. 12 is a flowchart (part 2) of the operation time process of the master domain and the slave domains.

The operations at steps S1103, S1104, S1109, and S1110 are executed by any slave domain among the slave domains ranked 1 to n. In FIG. 11, it is assumed in the description that the slave domain ranked 1 executes the process for simplicity of description. The operations at steps S1201, S1204, and S1205 depicted in FIG. 12 are executed by all the slave domains among the slave domains ranked 1 to n.

FIG. 11 is a flowchart (part 1) of the operation time process of the master domain and the slave domains. The master mechanism thread 402 determines whether memory access to another domain has occurred (step S1101). If memory access to another domain has occurred (step S1101: YES), the master mechanism thread 402 causes the memory managing unit 409 to give notification of an access request to the memory 109 of the other domain (step S1102).

At steps S1103 and S1104, it is assumed that the other domain is the slave domain ranked 1. The local master mechanism thread 407#1 determines whether a memory access request to the domain thereof has been received (step S1103). If a memory access request has been received (step S1103: YES), the local master mechanism thread 407#1 responds to the memory access request (step S1104) and transmits to the master mechanism thread 402, a response to the request source. After the transmission of the response, or if no memory access request has been received (step S1103: NO), the local master mechanism thread 407#1 transitions to the operation at step S1109.

After receiving the response to the access request, or if no memory access to another domain has occurred (step S1101: NO), the master mechanism thread 402 determines whether user operation has been received (step S1105). If a user operation has been received (step S1105: YES), the master mechanism thread 402 executes a user operation receiving process (step S1106). For example, a user operation receiving process, is a start process or a termination process executed for an application selected on a GUI by operation of the keyboard 106. After executing the user operation receiving process, the master mechanism thread 402 determines whether a thread generation request has been made by user operation (step S1107).

If a thread generation request has been made (step S1107: YES), the master mechanism thread 402 causes the scheduler 405 to notify any of the slave domains of the thread generation request (step S1108). In a domain selecting method of the scheduler 405, for example, a domain may be selected that includes a CPU having the lowest load among the CPUs 204 in the slave domains ranked 1 to n. In FIG. 11, it is assumed that the slave domain ranked 1 is notified.

The local master mechanism thread 407#1 determines whether a thread generation request to the domain thereof has been received (step S1109). If a thread generation request has been received (step S1109: YES), the local master mechanism thread 407#1 executes a thread generation process (step S1110). After the generation, or if no thread generation request has been received (step S1109: NO), the local master mechanism thread 407#1 transitions to step S1204 depicted in FIG. 12.

After the notification of the thread generation request, or if no thread generation request has been made (step S1107: NO), or if no operation has been received (step S1105: NO), the master mechanism thread 402 goes to the operation at step S1201.

FIG. 12 is a flowchart (part 2) of the operation time process of the master domain and the slave domains. The master mechanism thread 402 and the virtual master mechanism threads 406#1 to 406#n execute a master context transfer process (step S1201). Details of the master context transfer process will be described later with reference to FIGS. 13 and 14. The master mechanism thread 402 determines whether a predetermined period has elapsed (step S1202). If the predetermined period has elapsed (step S1202: YES), the master mechanism thread 402 executes a hardware check thread process (master) (step S1203). Details of the hardware check thread process (master) will be described later with reference to FIG. 15.

After termination of the process, or if the predetermined period has not elapsed (step S1202: NO), the master mechanism thread 402 transitions to the operation at step S1101. After completion of the master context transfer process, the virtual master mechanism threads 406#1 to 406#n execute the operation at step S1201 again.

The local master mechanism threads 407#1 to 407#n determine whether a predetermined period has elapsed (step S1204). If the predetermined period has elapsed (step S1204: YES), the local master mechanism threads 407#1 to 407#n execute a hardware check thread process (slave) (step S1205). After completion of the process, or if the predetermined period has not elapsed (step S1204: NO), the local master mechanism threads 407#1 to 407#n transition to the operation at step S1103.

The master context transfer process will be described with reference to FIGS. 13 and 14. To the master context transfer process executed by the system 100, either a master context transfer process 1 depicted in FIG. 13 or a master context transfer process 2 depicted in FIG. 14 is applied.

Figure 13:
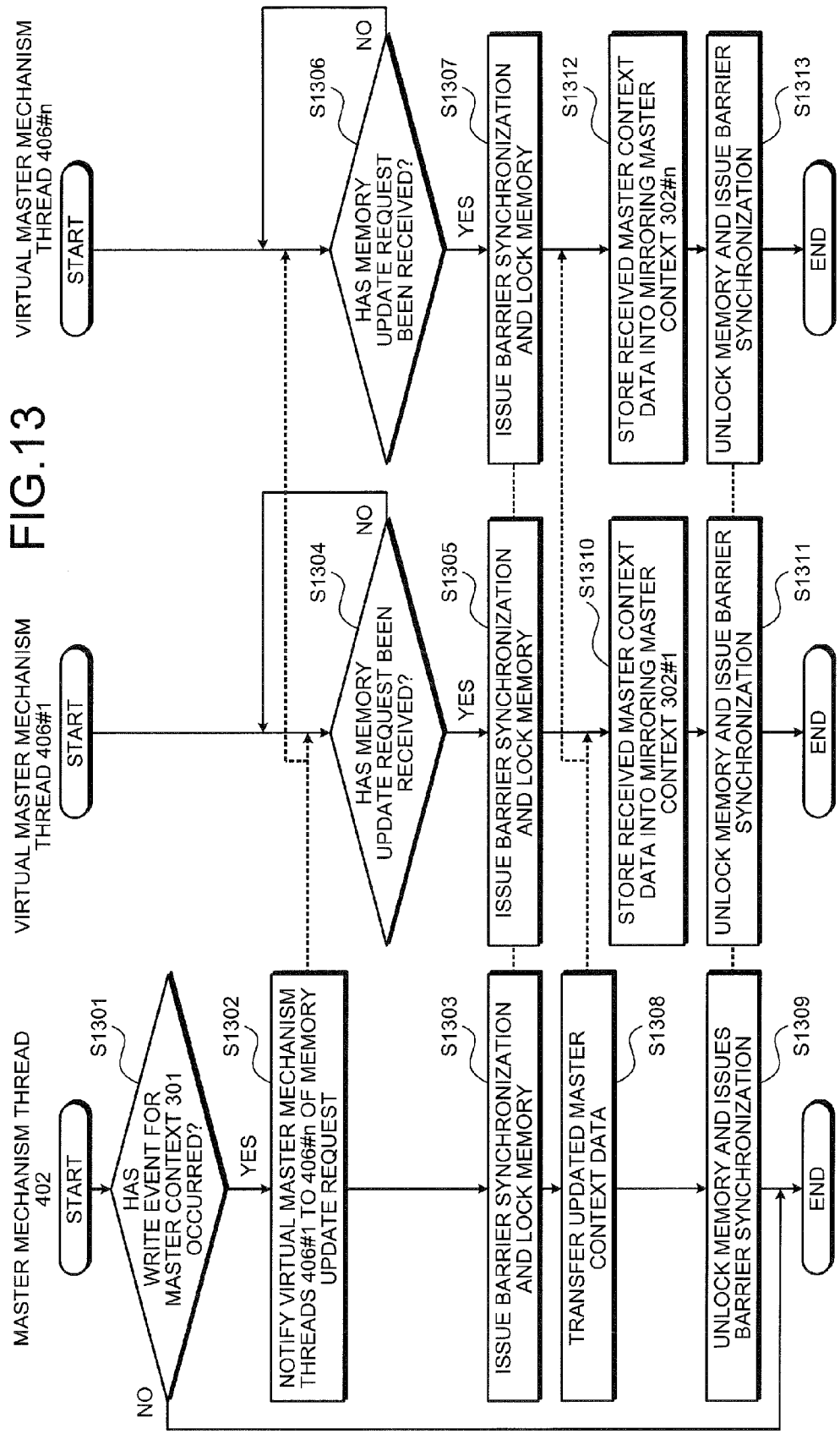
FIG. 13 is a flowchart of a master context transfer process 1.

FIG. 13 is a flowchart of the master context transfer process 1. The master mechanism thread 402 determines whether a write event for the master context 301 has occurred (step S1301). If a write event has occurred (step S1301: YES), the master mechanism thread 402 notifies the virtual master mechanism threads 406#1 to 406#n of a memory update request (step S1302). The master mechanism thread 402 issues barrier synchronization and locks the memory (step S1303).

The master mechanism thread 402 performing the barrier synchronization waits until the virtual master mechanism threads 406#1 to 406#n, which are in the same barrier synchronization group, perform the barrier synchronization. For example, the master mechanism thread 402 waits until the virtual master mechanism thread 406#1 executes the operation at step S1305 and the virtual master mechanism thread 406#n executes the operation at step S1307.

The virtual master mechanism thread 406#1 determines whether a memory update request has been received (step S1304). If a memory update request has not been received (step S1304: NO), the virtual master mechanism thread 406#1 executes the operation at step S1304 again. If a memory update request has been received (step S1304: YES), the virtual master mechanism thread 406#1 issues barrier synchronization and locks the memory (step S1305). Similarly, the virtual master mechanism thread 406#n executes the operations at steps S1306 and S1307. The operations at steps S1306 and S1307 are equivalent to the operations at steps S1304 and S1305 and therefore will not be described.

If the master mechanism thread 402 and the virtual master mechanism threads 406#1 to 406#n each issues the barrier synchronization, the master mechanism thread 402 transfers updated master context data (step S1308). The transfer destinations are the virtual master mechanism threads 406#1 to 406#n. The master mechanism thread 402 unlocks the memory and issues barrier synchronization (step S1309).

The virtual master mechanism thread 406#1 stores the received master context data into the mirroring master context 302#1 (step S1310) and unlocks the memory and issues barrier synchronization (step S1311). Similarly the virtual master mechanism thread 406#n stores the received master context data into the mirroring master context 302#n (step S1312); unlocks the memory and issues barrier synchronization (step S1313).

If the master mechanism thread 402 and the virtual master mechanism threads 406#1 to 406#n each issues the barrier synchronization, the master mechanism thread 402 and the virtual master mechanism threads 406#1 to 406#n terminate the master context transfer process 1. If no write event occurs (step S1301: NO), the master mechanism thread 402 terminates the master context transfer process 1.

As described above, the master context transfer process 1 realizes the suppression of the data transfer amount by narrowing a transfer area of the synchronization portion in the master context 301 to an updated point. Since the master context transfer process 1 causes a memory lock period, the bus 110 preferably has a high transfer rate.

FIG. 14 is a flowchart of the master context transfer process 2. In the description of FIG. 14, the same process is executed at steps S1403 to S1405 by the virtual master mechanism threads 406#1 to 406#n. Therefore, the description of FIG. 14 is assumed to be description of an execution example of the virtual master mechanism thread 406#1.

The master mechanism thread 402 determines whether a write event for the master context 301 has occurred (step S1401). If a write event has occurred (step S1401: YES), the master mechanism thread 402 updates the master context 301 (step S1402). If no write event has occurred (step S1401: NO), the master mechanism thread 402 terminates the master context transfer process 2.

The virtual master mechanism thread 406#1 sets a break point in the storage area of the master context 301 (step S1403). The break point set at step S1403 is preferably a break point responsive to a write access. The virtual master mechanism thread 406#1 determines whether a write access to the break point has occurred (step S1404).

If no write access has occurred (step S1404: NO), the virtual master mechanism thread 406#1 returns to the operation at step S1404. If a write access has occurred (step S1404: YES), the virtual master mechanism thread 406#1 generates and activates a context data transfer thread by using the transfer area address at which the write access has occurred and updated master context data as arguments (step S1405). The virtual master mechanism thread 406#1 terminates the master context transfer process 2.

The context data transfer thread is newly generated each time step S1405 is executed. The context data transfer thread is individually generated for each of the domains. In the following description, it is assumed that the context data transfer thread is activated in a slave domain to which the virtual master mechanism thread 406#1 belongs.

The newly activated context data transfer thread stores the thread ID thereof and a transfer area address into a transfer area management table (step S1406). The transfer area management table is a table including a thread ID field and a transfer area address field. The context data transfer thread determines whether an existing context data transfer thread having an identical transfer area address is present (step S1407).

If an existing context data transfer thread is present (step S1407: YES), the context data transfer thread issues a termination notification of the existing context data transfer thread (step S1408). An example of an issuing method is one in which the context data transfer thread executes an API terminating a thread from an API group provided by an OS, etc., by using the thread ID in the transfer area management table as an argument.

If no existing context data transfer thread is present (step S1407: NO), the context data transfer thread stores the received master context data into the mirroring master context 302#1 (step S1409). The context data transfer thread deletes from the transfer area management table, a record having the thread ID thereof set (step S1410) and terminates the thread execution.

As described above, the master context transfer process 2 can deal with the case when the transfer rate of the bus 110 is slow and the status table 303 is frequently updated. For example, in the system 100 to which the master context transfer process 2 is applied, the master context may be rewritten before the received master context data is stored in the mirroring master context 302#1.

FIG. 15 is a flowchart of a process of a hardware check thread (master). FIG. 15 depicts a process of a hardware check thread executed by the master domain. The hardware check thread executes a failed domain detection process (step S1501). Details of the failed domain detection process will be described later with reference to FIG. 17. The hardware check thread determines whether a failed domain has been detected (step S1502). If a failed domain has been detected (step S1502: YES), the hardware check thread sets the release of the virtual memory space allocated to the memory 109 of the failed domain (step S1503).

The hardware check thread sets the prohibition of writing to the memory 109 of the failed domain (step S1504), sets the prohibition of thread generation to the failed domain (step S1505), and terminates the execution of the thread. Multiple failed domains may be detected. In this case, the hardware check thread executes the operations at steps S1503 to S1505 for each of the detected failed domains. If no failed domain is detected (step S1502: NO), the hardware check thread terminates the thread execution.

FIG. 16 is a flowchart of a process of a hardware check thread (slave). FIG. 16 depicts a process of a hardware check thread executed by the slave domains ranked 1 to n. The hardware check thread executes a failed domain detection process (step S1601). Details of the failed domain detection process will be described later with reference to FIG. 17. The hardware check thread determines whether a failed domain has been detected (step S1602).

If a failed domain has been detected (step S1602: YES), the hardware check thread determines whether communication with the master domain is possible via the bus 110 (step S1603). In a method of determining whether communication with the master domain is possible, the hardware check thread can make the determination by using an API such as the inter-processor communication (IPC), which is communication among 100 processors.

If communication with the master domain is not possible (step S1603: NO), the hardware check thread activates the DBB 207 of the domain thereof (step S1604) and transmits communication to the DBB 207 of the master domain (step S1605). The DBB 207 of each of the domains has a specific ID and can perform transmission to another DBB 207 in the system 100 by using the specific ID in the transmission.

The hardware check thread determines whether a response has been received from the master domain (step S1606). If a response has been received from the master domain (step S1606: YES), the hardware check thread shuts down the domain thereof (step S1607). After the operation at step S1607, the hardware check thread terminates the thread execution so as to shut down the domain thereof. Step S1606: YES corresponds to the case of physical disconnection from the master domain.

If no response is received from the master domain (step S1606: NO), the hardware check thread determines whether the domain thereof is the surviving domain of the highest rank (step S1608). If the domain thereof is the surviving domain of the highest rank (step S1608: YES), the hardware check thread terminates the virtual master mechanism thread 406 (step S1609). Step S1608: YES corresponds to a case when the master domain fails and the domain thereof is substituted for the master domain.

The hardware check thread binds the mirroring master context 302 to the local master mechanism thread 407 (step S1610). For example, the hardware check thread switches data accessed by the local master mechanism thread 407 from a log output by the local master mechanism thread 407 to the mirroring master context 302.

The hardware check thread activates the local master mechanism thread 407 as the new master mechanism thread 402 (step S1611). The new master mechanism thread 402 starts executing a start process from the operation at step S1005. The hardware check thread terminates the thread execution.

If the domain of the hardware check thread is not the surviving domain of the highest rank (step S1608: NO), the hardware check thread terminates the thread execution. Step S1608: NO corresponds to a case when the master domain fails and another slave domain becomes the master domain while the domain thereof continues operation as a slave domain.

If communication with the master domain is possible (step S1603: YES), the hardware check thread terminates the thread execution. Step S1603: YES corresponds to a case when any of the slave domains has failed. If no failed domain is detected (step S1602: NO), the hardware check thread terminates the thread execution.

FIG. 17 is a flowchart of the failed domain detection process. The failed domain detection process is executed in a hardware check thread executed by the master domain and the slave domains ranked 1 to n.

The hardware check thread activates and causes the self-diagnostic circuit 208 in the domain thereof to perform diagnosis (step S1701). The hardware check thread selects from the status table 303#0, a record with a domain type field corresponding to the domain of the hardware check thread (step S1702). The hardware check thread writes a result of the self-diagnostic circuit 208 into the diagnostic result field of the selected record (step S1703). The hardware check thread determines whether a record having a diagnostic result of NG exists among the records of the status table 303 in the domain of the hardware check thread (step S1704). If a record having NG exists (step S1704: YES), the hardware check thread detects the domain of the existing record as a failed domain (step S1705).

After detecting the failed domain, if no other record has NG (step S1704: NO), the hardware check thread determines whether a record is present that has the diagnostic time field that has not been updated for a predetermined period or longer (step S1706). If no such record is present (step S1706: NO), the hardware check thread terminates the failed domain detection process.

If a record that has not been updated for the predetermined period or longer is present (step S1706: YES), the hardware check thread detects the domain of the existing record, as a failed domain (step S1707). After output, the hardware check thread terminates the failed domain detection process.

As described above, according to the processor management method, a system is constructed from a domain group including inexpensive SoCs and memory, and memory spaces are coupled by setting an offset value to the memory of each domain. As a result, in the system to which the processor management method is applied, each domain can utilize a wider memory space and an inexpensive, high-performance system can be provided to the user. The wider memory space facilitates concurrent execution of multiple applications by the system.

According to the processor management method, updated context data may be transferred from a master domain to a slave domain and stored to memory in the slave domain. As a result, if a failure occurs in the master domain, the slave domain can use the context data in the memory thereof to continue the system. The system can suppress the amount of data transferred consequent to narrowing down the data to an updated point.

According to the processor management method, when a write access to a break point set in the master domain is detected, updated context data for the break point may be stored into the memory in the slave domain. As a result, if a failure occurs in the master domain, the slave domain can use the context data in the memory of the slave domain to continue operation of the system. The form of the system can deal with a case when a bus between the domains is slow and the master context is frequently changed.

According to the processor management method, before completion of the execution of a first thread that stores data for the break point into memory in the slave domain, if a second thread storing data into the memory at the same address is detected, the process of the first thread may be terminated. As a result, in the case of an updating method utilizing a break point, an unnecessary process can be prevented from being executed.

According to the processor management method, a failure in another domain may be detected. As a result, a failure of the master domain or a failure in a bus between domains can be detected.

According to the processor management method, a diagnostic result and a diagnostic time of the domain of the processor performing the diagnosis may be written into a master context and a failure of another domain may be detected based on diagnostic results and diagnostic times indicated in the transferred mirrored master context in the domain of the processor. As a result, the number of diagnoses of domains can be minimized, and a reference can be made to a diagnostic result of another domain.

According to the processor management method, when a failure is detected, the master domain may stop a portion of the process for the domain that has failed. For example, the master domain sets the release of the memory space allocated to the memory of the corresponding domain. As a result, the system can prevent the memory of the failed domain from being newly used. The master domain prohibits writing to the memory of the corresponding domain. As a result, the system can avoid memory corruption due to a runaway application in the corresponding domain or a memory clear due to an automatic reset. The master domain sets the prohibition of thread generation to the corresponding domain. As a result, the system can allocate an application while avoiding domains that cannot execute the application.

According to the processor management method, when a failure is detected, a local master mechanism notifies a master mechanism to determine whether the failure is a failure of the master mechanism. According to the processor management method, in the case of a failure of the master mechanism, it may be determined whether the lock master mechanism is in a state of managing multiple processors. As a result, in the system to which the processor management method is applied, at the time of a failure of the master domain, a domain to be the next master domain can be determined from among the slave domains.

According to the processor management method, if no response is received for the notification to the master domain, transmission to the DBB of the master domain is performed to determine whether its own domain is disconnected from the master mechanism and, if disconnected, the operation of its own domain may be terminated. As a result, even when the master domain is operating, if a domain is separated due to a failure, the separate domain does not continue operating and wasted power consumption can be reduced.

According to the processor management method, if it is determined that a slave domain is in a state of managing multiple processors, the slave domain may be set as a new master domain. As a result, in the system to which the processor management method is applied, when a failure occurs, the execution of the new master domain minimizes functional and performance limitations and enables continuous use. These operations enable the user of the system to which the processor management method is applied to leave a unit that has a failed domain for repair while continuing to user the system with the remaining domains.

The processor management method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to an aspect of the present invention, a low-cost, high-performance system can be provided to the user.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor management method for a system that includes domains, each of which includes a processor and memory, the method comprising:
    causing a first processor of a first domain among the domains to execute:
        setting a master mechanism that stores master context data for managing the domains into memory of the first domain; and
        notifying each of the processors of the domains of an offset value of an address to allow a shared memory managed by the master mechanism to be accessed as a continuous memory by each of the processors of the domains; and
    causes each of second processors of second domains among the domains except the first domain to execute:
        setting a local master mechanism that manages the respective second domain; and
        setting a virtual master mechanism that copies the master context data into memory of the respective second domain.

2. The processor management method according to claim 1, wherein each of the second processors further execute:
    allocating, after the notifying of the offset value and based on the offset value, the shared memory to the memory of the respective second domain by the local master mechanism.

3. The processor management method according to claim 1, wherein each of the second processors further execute:
    storing, by the virtual master mechanism, the master context data transferred from the master mechanism into the memory of the respective second domain.

4. The processor management method according to claim 1, wherein each of the second processors further execute:
    storing, by the virtual master mechanism and upon detecting a break point set in the master mechanism, the master context data transferred from the master mechanism into the memory of the respective second domain.

5. The processor management method according to claim 4, wherein each of the second processors further execute:
    terminating a storing process of a first thread when the master context data that has been updated is detected in a second thread when the master context data is to be stored in the memory of the respective second domain by the first thread.

6. The processor management method according to claim 1, wherein each of the processors further execute:
    a process for detecting a failure by the master mechanism or the local master mechanism.

7. The processor management method according to claim 6, wherein each of the processors further execute:
    writing, at predetermined intervals, a time stamp or accompanying information into the master context data of the master mechanism by the master mechanism or the local master mechanism, wherein
    process includes detecting the failure based on the time stamp or the accompanying information.

8. The processor management method according to claim 6, wherein the first processor further executes:
    suspending, by the master mechanism, at least a portion of a process when the failure is detected.

9. The processor management method according to claim 6, wherein each of the second processors further execute:
    determining the failure is a failure of the first domain, when the failure is detected and notified to the master mechanism by the local master mechanism; and
    determining whether the local master mechanism is in a state of managing the domains, when the failure is determined to be a failure of the first domain.

10. The processor management method according to claim 6, wherein
    each of the domains includes a telephone communication device having telephone communication functions, and each of the second processors further execute:
    determining, when the failure is detected and no response is received for notification sent to the first domain, whether the respective second domain is disconnected from the first domain based on presence/absence of a response to a call sent to a telephone communication device of the first domain from a telephone communication device of the respective second domain; and
    terminating operation of each of the second processors of the second domains when the respective second domain is determined to be disconnected from the first domain.

11. The processor management method according to claim 6, wherein
    the setting of the master mechanism includes setting, by one of the second processors of the second domains, the local master mechanism as a new master mechanism, when the local master mechanism is determined to be in a state of managing the domains.

\* \* \* \* \*